US012666272B2

(12) United States Patent
Schertz

(10) Patent No.: US 12,666,272 B2
(45) Date of Patent: Jun. 23, 2026

(54) DEVICE, METHOD AND SYSTEM FOR PROVIDING A SENSOR NODE OF A WIRELESS NETWORK USING COMPARISON INFORMATION

(71) Applicant: Infineon Technologies AG, Neubiberg (DE)

(72) Inventor: Christoph Nikolaus Schertz, Frohnleiten (AT)

(73) Assignee: Infineon Technologies AG, Neubiberg (DE)

( * ) Notice: Subject to any disclaimer, the term of this patent is extended or adjusted under 35 U.S.C. 154(b) by 228 days.

(21) Appl. No.: 18/591,903

(22) Filed: Feb. 29, 2024

(65) Prior Publication Data

US 2024/0323701 A1 Sep. 26, 2024

(30) Foreign Application Priority Data

Mar. 8, 2023 (DE) ......................... 102023202079.3

(51) Int. Cl.
*H04W 16/00* (2009.01)
*H04W 4/38* (2018.01)
*H04W 16/18* (2009.01)
*H04W 84/18* (2009.01)

(52) U.S. Cl.
CPC ............. *H04W 16/18* (2013.01); *H04W 4/38* (2018.02); *H04W 84/18* (2013.01)

(58) Field of Classification Search
CPC ....... H04W 16/18; H04W 4/38; H04W 84/18; H04W 370/254
See application file for complete search history.

(56) References Cited

U.S. PATENT DOCUMENTS

| | | | | |
|---|---|---|---|---|
| 11,506,525 | B2 * | 11/2022 | Hartung | ................. G01D 18/00 |
| 2015/0006450 | A1 * | 1/2015 | Ferre | .................... H04L 41/0856 |
| | | | | 706/14 |
| 2017/0284839 | A1 * | 10/2017 | Ojala | ...................... H04L 67/12 |
| 2020/0092788 | A1 | 3/2020 | Prasanna et al. | |
| 2020/0408927 | A1 | 12/2020 | Youssef et al. | |
| 2023/0403588 | A1 * | 12/2023 | Kumar | .................... H04L 41/16 |

FOREIGN PATENT DOCUMENTS

| | | |
|---|---|---|
| CN | 103354654 A | 10/2013 |
| CN | 104053209 A | 9/2014 |
| CN | 104159295 A | 11/2014 |
| CN | 105516980 A | 4/2016 |
| CN | 111372214 A | 7/2020 |

* cited by examiner

*Primary Examiner* — Khai M Nguyen
(74) *Attorney, Agent, or Firm* — Harrity & Harrity, LLP

(57) ABSTRACT

Some example implementations according to the present disclosure encompass a device for providing a sensor node of a wireless network, wherein the device includes a communication apparatus and a processing apparatus. The communication apparatus is configured to receive a signal from a further device that is configured to form a sensor node of a wireless network, wherein the signal contains comparison information different from an ID. The processing apparatus is configured to evaluate the received comparison information of the further device based on a criterion. The device is furthermore configured to form at least part of the wireless network together with the further device if the criterion is met. Furthermore, some example implementations encompass methods and systems for providing a sensor node of a wireless network using comparison information.

20 Claims, 9 Drawing Sheets

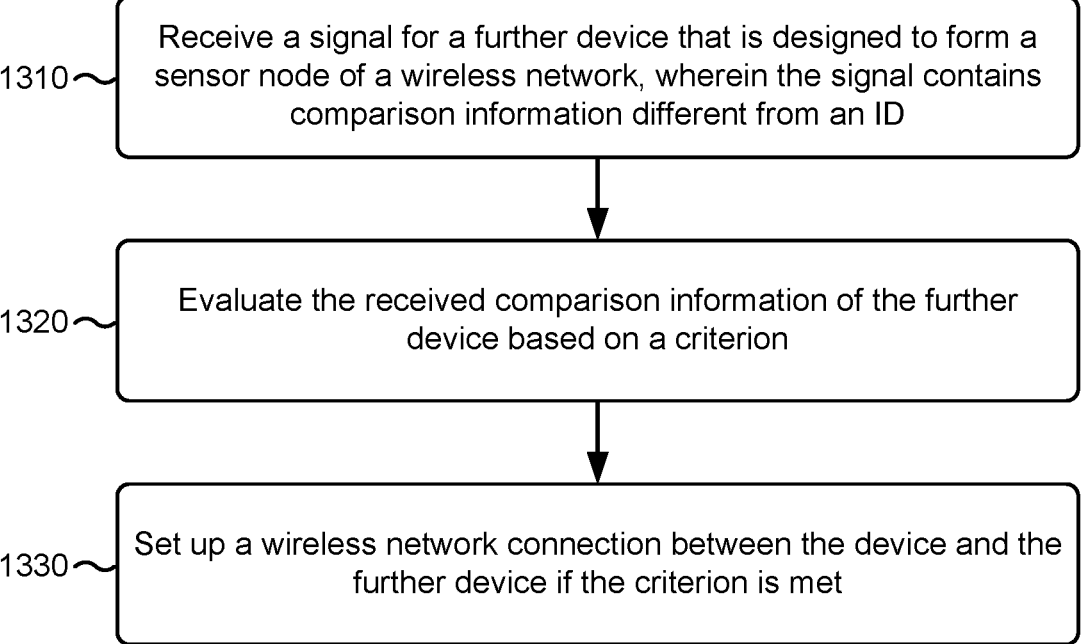

1310 — Receive a signal for a further device that is designed to form a sensor node of a wireless network, wherein the signal contains comparison information different from an ID 1320 — Evaluate the received comparison information of the further device based on a criterion 1330 — Set up a wireless network connection between the device and the further device if the criterion is met

FIG. 13

DEVICE, METHOD AND SYSTEM FOR PROVIDING A SENSOR NODE OF A WIRELESS NETWORK USING COMPARISON INFORMATION

CROSS-REFERENCE TO RELATED APPLICATION

This application claims priority to German Patent Application No. 102023202079.3 filed on Mar. 8, 2023, the content of which is incorporated by reference herein in its entirety.

TECHNICAL FIELD

Some example implementations according to the present disclosure encompass devices, methods and systems for providing a sensor node of a wireless network using comparison information. Further example implementations encompass self-organizing wireless networks. Some example implementations also encompass methods for organizing network participants using a "Cluedo"®-style algorithm.

BACKGROUND

Modern networks often consist of a large number of wireless communication devices. With regard to forming such a network, one problem is then that such a large number of wireless communication devices, in order to form the network, need to know whether they are part of the network or belong to another network. Such wireless communication devices may for example in particular be sensor nodes, meaning that for example groups of sensor nodes have to form respective networks. In concrete terms, one problem may therefore be for example that sensors of a first vehicle are supposed to form a common network, but at the same time not a network with a second vehicle that is for example arranged nearby.

One example of such a problem is explained in more detail below: For instance, following a switch-on procedure, an individual sensor node (hereinafter also referred to as node for short) may not yet have any information as to the one or more further nodes with which a network should be formed in a wireless environment. By way of example, there may be a large number of possible nodes within a possible transmission range. In many application cases, it may be necessary or desirable here to form a network with some of these nodes (that is to say to add them to a network, for example), but not all of them. In other words, for example, only some of the nodes should thus become network participants. Another problem may be that some nodes are out of sight, that is to say for example out of range (for example in the sense of a transmission range). Direct transmission to such nodes may thus not be possible, for example because they are too far away. The problem may then again be that nodes of this kind should also be added to a corresponding network, but possibly not all such nodes.

Examples of networks to be formed may in this case include sensor nodes in a vehicle at exposed locations or at locations where wiring is not possible. Such locations may occur for example in areas inside tires, on loading platforms or in configurations of vehicles with trailers. Further examples in which such networks should be formed may also include groups of containers in a warehouse or groups of products in a department store.

Modern conventional approaches to forming a corresponding network are therefore reliant on ensuring that only correct wireless nodes form the network. The following solutions exist in this regard: manual configuration, hard-coded software, the use of a superordinate main unit that communicates individually with each node and knows the nodes in advance (manual configuration or hard-coded programming).

The problems with conventional solutions in this case are that corresponding manual configuration work entails high costs, hard-coded software complicates the development and distribution of software, and communication between different sensor nodes, that is to say for example from one point, for example of the network, to another is often not possible, for example due to a limited transmission range.

There is therefore a need for a concept for providing a sensor node of a wireless network that allows for an improved compromise between flexibility, network robustness and associated configuration effort.

SUMMARY

Some example implementations according to the present disclosure encompass a device for providing a sensor node of a wireless network, wherein the device includes a communication apparatus and a processing apparatus. The communication apparatus is configured to receive a signal from a further device that is configured to form a sensor node of a wireless network, wherein the signal contains comparison information different from an ID. The processing apparatus is configured to evaluate the received comparison information of the further device based on a criterion. The device is furthermore configured to form at least part of the wireless network together with the further device if the criterion is met.

The inventors have recognized that it is possible, based on the evaluation of the comparison information based on the criterion, that is to say for example based on a comparison of the comparison information with the criterion, to assess whether the device should form a sensor node in a wireless network that also includes the further device. The inventors have recognized here that, for this purpose, it is possible to use comparison information different from an ID (that is to say for example from a simple identification, for example in the form of a character or a number that designates or describes the device), that is to say for example information about a type of sensor, such as for example the information "tire pressure sensor" or else a sensor measured value, such as for example "acceleration", "temperature". However, the comparison information may also furthermore include information about a signal strength, for example RSSI, direction information, that is to say for example information about a relative position between the device and the further device and/or position information (for example absolute or relative).

In other words, the inventors have recognized that network membership may be determined based on characteristic information, that is to say the comparison information, that goes beyond a simple ID. The comparison information may be selected accordingly here on an application-specific basis. By way of example, if the devices are sensor nodes of a vehicle, it could for example be discovered, based on an acceleration, whether corresponding devices belong to the same vehicle and thus for example should form a common network.

Accordingly, the criterion may also be defined according to a specific application. It should in particular be noted that a corresponding criterion may also be adapted dynamically and/or adaptively.

By way of example, the criterion may thus, on the one hand, be an absolute criterion, such that for example a distance from further devices is inferred with regard to a signal strength and the criterion is taken as a basis for defining a minimum and a maximum distance, based on which common membership of a network is concluded.

On the other hand, according to some example implementations, relative criteria may also be defined, such that for example comparison information, for example including a sensor measured value, of the further device is allowed to deviate in relative terms, that is to say for example in percentage terms, at most only by a certain proportion from a characteristic, for example comparison information, for example likewise a sensor value, of the device, in order to ensure that the two devices belong to a common wireless network.

However, it should be noted here that a corresponding criterion does not necessarily have to be predefined. A corresponding criterion may thus also be established for example based on an evaluation of the received signal or concrete received comparison information. The comparison information may thus in particular include a multiplicity of partial information items, such that the processing apparatus is configured for example to find similarities with the further device and to establish a thesis for a common criterion based thereon.

The criterion may then for example also be applied for comparison information of further devices, in order for example to form a network with these further devices if the criterion is met, or else for example in order to adapt the criterion based on the further comparison information. By way of example, a corresponding device may be informed beforehand that the network to be formed should include a certain number of devices, that is to say for example specifically sensor nodes, such that a corresponding criterion may be defined based on such additional information based on a search for similarities. This then enables, for example, without a-priori definition of the criterion for evaluating the comparison information, adaptive or for example dynamic adaptation of the wireless network, for example if the number of devices (that is to say for example sensor nodes) is to be changed, such that a decision is no longer made regarding membership of the wireless network based on the number of devices or sensor nodes, but only based on the "self-defined" criterion. Some example implementations thus in particular include adapting the criterion.

It should be noted here that a combination of criteria may also be applied. By way of example, one portion of the comparison information may thus be compared with an absolute criterion and another portion of the comparison information, or even the same portion, may at the same time be compared with relative comparison information. As explained above, another part of the criterion may then also have been determined adaptively beforehand or may also additionally be determined adaptively.

At this point, it should be noted that the criterion may also represent a temporal availability of the comparison information of the further device. If comparison information is only available for a short period of time, then a device may for example be excluded from the network formation in some cases.

Some example implementations thus enable self-organizing wireless networks. The inventors have also recognized here that the one or more criteria may accordingly be evaluated in particular based on an exclusion principle. By way of example, it is thus possible to define necessary similarities (for example in the sense of necessary criteria) between the device and the further device that have to be satisfied in any case, for example an identical type of sensor. Further comparison information (for example not containing any information regarding necessary similarities) may also be evaluated based on a successive exclusion based on further criteria that are generated, for example adaptively.

Generally speaking, the exclusion of further devices, according to some example implementations, may in this case be carried out in particular in line with an algorithm based on the game "Cluedo"®. By way of example, comparison information of the device itself, for example its own sensor measured values (for example, corresponding to one's own cards in "Cluedo"®), may be compared or evaluated with the received comparison information based on the criterion (for example, corresponding to determining other players' cards in "Cluedo"®). Compared to the game, however, it is not the comparison information (that is to say for example room, weapon, suspect) that is assessed here, for example, but rather the corresponding device itself (corresponding to the players). Another difference is then for example that the criterion itself may be created based on the comparison information and that similarities may be found based on the criterion (for example a similar acceleration of the device and of the further device).

Thus, according to some example implementations, to form one or more wireless networks, a set of freely available sensor nodes, that is to say for example sensor nodes in radio range, may thus come together independently, that is to say for example come together in multiple groups, for example at least two groups, in order to form the respective wireless networks.

By way of example, in some implementations, a list containing member network participants may then be stored in each corresponding sensor node. Conventional "routing" network techniques may be applied here or, in other words, corresponding network techniques may be oriented to conventional network techniques on the subject of "routing", according to some example implementations.

In summary, a core aspect according to some example implementations is the independent setup of a network based on or by way of a distinction as to which device, or in other words sensor node, may or should form a network, and which may or should not.

In some implementations, a corresponding communication apparatus of a device according to some example implementations may furthermore be configured for example to exchange information between the individual nodes, for example information that goes beyond information used for the network setup, or for example to forward information. In some implementations, the communication apparatus may thus be configured to forward information to other nodes, for example in particular when a single node is not able to provide the necessary range to the data receiver or an auxiliary device, such as for example a hand-held device, is used to read out some or even all of the sensor nodes, but it is possible for example to physically contact only one node in the network and thus still receive or read out all information from all network participants.

It should be noted here that corresponding communication may then take place for example in a node-specific manner (unicast), or else for example in multicast for a plurality or even all sensor nodes. Conventional network techniques with regard to routing may for example again be used for a corresponding functionality. To give a better understanding, the use of the criterion will be discussed briefly once again below with reference to an example based on example implementations.

As explained above, the criterion may be predetermined or generated adaptively. The criterion may be an absolute or a relative criterion. In concrete terms, for example, comparison information may thus be received from the further device, such as for example a speed measured value, for example speed=20 km/h, wherein the device, or more precisely the processing apparatus of the device, is configured to evaluate or compare this comparison information. In concrete terms, the criterion may thus for example be predetermined, such that for example the device's own speed must be within a fixed interval of 15 km/h to 25 km/h in order to conclude that both devices belong to a common wireless network.

Furthermore, as explained above, the criterion may also be relative, such that the speed of the device may for example deviate by up to 10% from the speed of the further device in order to infer a corresponding membership. Furthermore, however, in a criterion finding phase, it is also possible, based on the received information speed=20 km/h, to establish the thesis whereby devices having a speed in the interval of for example 15 km/h to 20 km/h could possibly belong to a common network. A corresponding thesis may for example be compared with further devices or, more precisely, corresponding comparison information of further devices.

Some example implementations thus enable the creation of wireless networks with high flexibility, robustness and low configuration effort.

BRIEF DESCRIPTION OF THE DRAWINGS

Some examples according to the present disclosure are explained in more detail below with reference to the accompanying figures. With regard to the schematic figures that are illustrated, it should be noted that the illustrated function blocks should be understood both to be elements or features of the device according to the disclosure and to be corresponding method steps of the method according to the disclosure, and also corresponding method steps of the method according to the disclosure may be derived therefrom. In the figures:

FIG. 13 shows a schematic block diagram of a method for providing a sensor node of a wireless network by way of a device, according to some example implementations.

DETAILED DESCRIPTION

Before example implementations are explained in more detail below with reference to the drawings, it is noted that identical, functionally identical or identically acting elements, objects and/or structures across the figures are provided with the same or similar reference signs, and so the descriptions of these elements set forth in different example implementations are interchangeable with one another or may be applied to one another.

Figure 1:
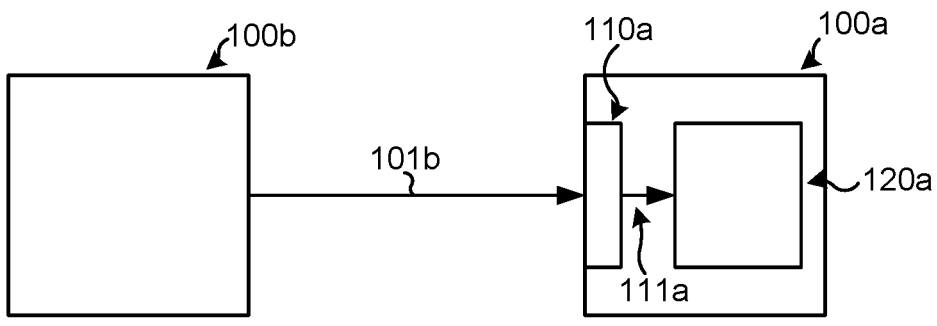
FIG. 1 shows a schematic view of a device for providing a sensor node of a wireless network, according to some example implementations.

FIG. 1 shows a schematic view of a device for providing a sensor node of a wireless network, according to some example implementations. FIG. 1 shows a device 100*a* having a communication apparatus 110*a* and a processing apparatus 120*a*. FIG. 1 also shows a further device 100*b*. The further device 100*b* is configured to form a sensor node of a wireless network. As shown in FIG. 1, the communication apparatus 110*a* may receive a signal 101*b* from the further device 100*b*. The signal 101*b* in this case comprises comparison information different from an ID. The communication apparatus 110*a* in this case provides the processing apparatus 120*a* with corresponding information 111*a*, that is to say for example the signal or the comparison information different from the ID. The processing apparatus 120*a* may then in turn evaluate the received comparison information of the further device 100*b* based on a criterion. The device 100*a* is in this case configured to form at least part of the wireless network together with the further device 100*b* if the criterion is met.

The further device 100*b* may for example in this case have the same features as or features similar to the device 100*a*. According to some example implementations, reciprocal communication may thus in particular be carried out. Thus, for example, the roles of the device 100*a* and 100*b* may be swapped, such that for example both satisfy the functionality explained above. As explained above, the criterion may in this case for example be predetermined or else generated based on the signal 101*b*. The criterion may also be provided for example by an external apparatus via the communication apparatus 110*a* of the device 100*a*. It should once again be noted here that the signal 101*b* comprises for example information characteristic of the device 100*b* based on which it is possible to assess common membership of a network. The information may in this case for example be encoded into the signal, for example such as a measured value, for example speed or acceleration, or the information may be derived based on a physical property of the signal 101*b*.

In some implementations, the comparison information may thus for example contain at least one of information about a physical measurable property of the further device 100*b*, information about a physically measurable state of the further device 100*b* and/or information about a spatial relationship, for example about a distance and/or an angle, between the device 100*a* and the further device 100*b*.

As explained above, corresponding information, that is to say for example an acceleration or a speed or a temperature or a mass, may characterize the further device 100*b*. Corresponding information about a spatial relationship between the devices may in this case likewise be encoded into the signal 101*b* or else be extracted therefrom.

According to some example implementations, the processing apparatus 120*a* is furthermore configured to decode the comparison information of the further device 100*b* based on the received signal 101*b*. As an alternative or in addition, the comparison information of the further device 100*b* contains information about a physical property, for example RSSI, of the signal received from the further device, and in this case the processing apparatus 120*a* may accordingly be configured to derive the information about the physical property from the received signal.

As discussed briefly above, corresponding comparison information or at least a portion thereof may thus be encoded into the signal 101*b*, that is to say for example in the form of a coded measured value, and/or corresponding comparison information may contain information extracted from the signal itself by the processing unit 120*a*, that is to say information extracted from the physical signal itself. By way of example, corresponding extraction information may be a signal strength based on which it is possible to infer a distance of the further device 100*b* from the device 100*a*, meaning that such a distance does not have to be explicitly encoded into the signal. It should be noted here that it may be particularly advantageous, according to some example implementations, to use both information sources, that is to say for example information encoded into the signal itself, such as for example sensor measured values, and derived information, that is to say information extracted from the signal.

Figure 2:
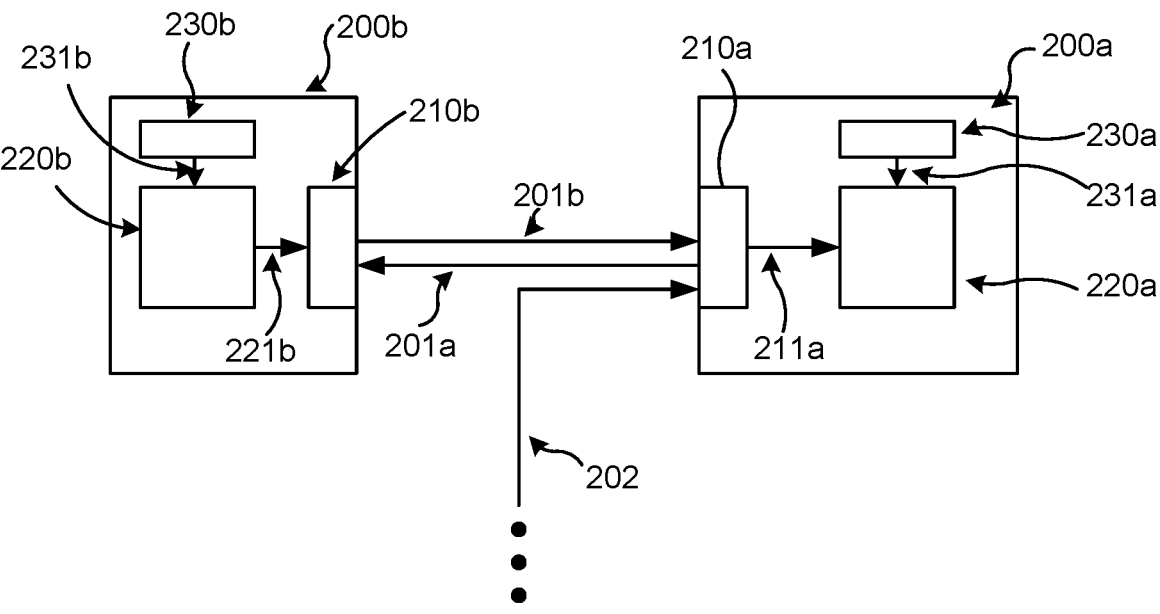
FIG. 2 shows a schematic view of a device having a sensor apparatus, according to some example implementations.

FIG. 2 shows a schematic view of a device having a sensor apparatus, according to some example implementations. FIG. 2 shows a device 200*a* having a communication apparatus 210*a*, a processing apparatus 220*a*, and a sensor apparatus 230*a*. FIG. 2 also shows a further device 200*b*. In some implementations, the further device 200*b* has the same design as the device 200*a*. However, it should be noted that this is in no way necessary. The further device 200*b* accordingly comprises a communication apparatus 210*b*, a processing apparatus 220*b* and a sensor apparatus 230*b*.

In some implementations, the sensor apparatus 230*a* is configured to record at least one sensor measured value, that is to say for example an acceleration and/or a temperature. The comparison information of the further device 200*b* may furthermore contain at least one sensor measured value of the sensor apparatus 230*b* of the further device 200*b*. As explained above in the context of FIG. 1, the communication apparatus 210*a* is configured here to receive the signal 201*b* from the further device 200*b*, wherein the signal 201*b* comprises the comparison information, explained above, of the further device 200*b*. In some implementations, the processing apparatus 220*a* is furthermore configured to compare the at least one received sensor measured value of the further device 200*b* with the at least one sensor measured value of the device 200*a* and to evaluate the comparison result based on the criterion. As an alternative or in addition, the processing apparatus 220*a* may be configured to evaluate both the at least one received sensor measured value of the further device 200*b* and the at least one sensor measured value of the device 200*a* based on the criterion. The inventors have recognized that it is possible to perform particularly reliable network formation based on an evaluation of sensor measured values.

By way of example, the sensor apparatus 230*b* of the further device 200*b* is thus able to record measurement information about a property or a state of the device 200*b*. As illustrated, information 231*b*, which may comprise such a sensor measured value, may for example be provided to an associated processing apparatus 220*b*. In some implementations, a corresponding processing apparatus 220*b* may code such information and provide corresponding coded information 221*b* to the communication apparatus 210*b* of the further device 200*b*. As explained above, this may then provide a signal 201*b* comprising corresponding comparison information with sensor measured value for the communication apparatus 210*a*. In some implementations, the communication apparatus 210*a* may be configured here for example to extract a corresponding sensor measured value from the signal 201*b* and/or to derive for example further comparison information from the signal 201*b*. Corresponding information 211*a*, as explained above, for example comprising a decoded sensor measured value of the sensor apparatus 230*b* and/or information derived from the physical signal 201*b*, may thus be provided to the processing apparatus 220*a*.

Similarly, the processing apparatus 220*a* may be provided with corresponding information about a state or a physical property in the form of the information 231*a* from the sensor apparatus 230*a*, for a corresponding evaluation.

The processing apparatus 220*a* may then compare the respective sensor measured values, for example in order to determine a difference or a quotient between the sensor measured values, and evaluate such a result based on the criterion. As explained above, a corresponding evaluation may however also be performed in each case individually for the sensor measured values, such that for example both the measured value of the further device and the measured value of the device are evaluated based on a criterion. By way of example, it may be known a priori that devices should belong to a common network if their associated sensor measured values for example have a vibration frequency that is within a certain interval. Evaluating a comparison result between the sensor measured values based on the criterion may be expedient here for example for the use of relative criteria, for example a relative deviation from one another.

In some implementations, the processing apparatus 220*a* is thus configured to carry out an evaluation based on the criterion in order to evaluate whether the comparison result and/or a respective sensor measured value is within an absolute or relative value range. In order to carry out the evaluation with regard to a relative value range, it may for example be determined whether a deviation of the sensor measured value of the device and, in some implementations, of the further device is for example at most +/−1 km/h or for example at most +/−1% of a mean value of the sensor measured values of the device and of the further device. Some example implementations thus enable flexible use of evaluation criteria, such that non-trivially connected networks may also be formed.

As a further feature, in some implementations, the communication apparatus 210*a* is configured to receive an additional reception signal 202. The additional reception signal 202 may for example comprise information for adapting or setting the criterion. Accordingly, the processing unit 220*a* may for example be configured to determine and/or adapt the criterion based on the additional reception signal. Accordingly, the communication apparatus 210*a* may be configured to extract corresponding information from the signal 202 and to provide it as a portion of the information 211*a* or as information 211*a*. A corresponding signal 202 may be provided for example by an external device, for example by a hand-held device. According to some example implementations, devices may thus be adapted to changed requirements or network configurations.

In some implementations, the received signal 201b of the further device 200b may for example contain a plurality of comparison information items different from an ID. In such a case, the processing apparatus 220a is configured, in some implementations, to evaluate the plurality of comparison information items based on a plurality of criteria, wherein the processing apparatus is configured to compare different comparison information items with different criteria. As an alternative or in addition thereto, the processing apparatus may however also be configured to evaluate the plurality of comparison information items based on the criterion. Furthermore, the device 200a is configured to form at least part of the wireless network together with the further device 200b if a predetermined number of comparison information items meet the respective associated criterion and/or if at least a predetermined number of comparison information items meet the criterion. Thus, according to some example implementations, it is possible to improve robustness of the network formation. In addition, taking into consideration a multiplicity of comparison information items makes it possible to depict complex relationships with regard to membership of the network.

It should be noted that any combination of evaluations may be performed according to some example implementations. By way of example, each comparison information item may be evaluated based on a separate criterion. All of the comparison information items may also be evaluated based on the same criterion, or some comparison information items are evaluated based on separate criteria, while other comparison information items are evaluated based on a common criterion.

By way of example, based on a relative criterion, such as for example a percentage deviation, such a criterion could be used for a multiplicity of, even different, comparison information items. In concrete terms, for example, the signal 201b could thus comprise information about an acceleration and a temperature of the device 200b. Corresponding sensor measured values, which may be encoded into the signal 201b, may accordingly be compared with sensor information 231a of the device 200, wherein, as explained above, for example, a common criterion, such as for example a ±1% tolerance, may be applied in order to decide whether the two devices 200a, 200b should belong to a common network.

In some implementations, for example, for the two information items regarding acceleration and temperature, separate criteria may be evaluated in each case, that is to say for example a first criterion, such as for example a deviation of measured values of the sensor apparatus 230a of ±1 km/h, and a second criterion, such as for example a deviation of a temperature value of the sensor apparatus 230a of ±1 kelvin.

As explained above, a decision regarding membership of a common network may be made here for example based on whether a certain number, such as for example three, criteria are met or else whether a corresponding predetermined number of comparison information items meet a common criterion.

As already explained above and also shown in FIG. 2, according to some example implementations, bidirectional communication may also take place between the devices 200a and 200b. To this end, the communication apparatus 210a may be configured to provide a signal 201a for the device 200b. The inventors have recognized that such an exchange may be used in a particularly efficient and robust manner to assess common membership of a common network. Such communication may in this case be used in particular to take into consideration a comparison result or, in other words, information about an evaluation of a criterion from the further device 200b, that is to say from another potential sensor node.

In some implementations, the communication apparatus 210a is furthermore configured to provide the at least one further device 200b with comparison information, different from an ID, of the device 200a (for example by way of the signal 201a) and to receive information about an evaluation of the provided comparison information of the device 200a from the further device 200b (for example by way of the signal 201b). In this case, the device 200a is configured to form at least part of the wireless network together with the further device 200b based on the received information about the evaluation.

The comparison information of the device 200a may in this case in turn be encoded into the signal 201a, or be able to be extracted from the physical signal 201a. In particular, corresponding comparison information may comprise a sensor measured value of the sensor apparatus 230a. The evaluation of such information in the device 200b may in this case be carried out as explained above in the context of the device 200a, that is to say for example by way of the processing apparatus 220b, for example using respective sensor information of the sensor apparatus 230b. In some implementations, the signal 201b may therefore comprise the information about the evaluation of the provided comparison information.

In some implementations, further device 200b may thus also be provided with information about a result of the evaluation of the criterion by the device 200a by way of the signal 201a. Thus, for example, according to some example implementations, devices may thus provide further devices with information as to whether or not the respective further device or its provided comparison information meet the criterion of the device 200a with regard to membership of a common network. Thus, for example, based on a corresponding acceptance or rejection, reciprocal evaluation of comparison information, that is to say for example, in the case described above, specifically an evaluation by the processing apparatus 220b of comparison information of the device 200a, may be skipped if the information 201a already comprises an assessment with regard to common membership of a wireless network. Both evaluations may of course also be applied in order to increase the robustness of the network formation.

It should also be noted that, based on such bidirectional communication, it is in particular also possible to define criteria based on which the devices are able to decide whether they belong to a common wireless network. Thus, for example, as explained above, it is possible, based on exchanged sensor measured values, to establish a criterion that is met for example by both sensor measured values and is able to form a thesis for common membership of a common wireless network. A corresponding criterion may then be used for example to compare sensor measured values from further devices. Based thereon, the criterion may again be adjusted or a corresponding network may be formed. Some example implementations thus enable efficient self-organization of networks, including without or with only a little a-priori information about the network to be formed.

Figure 3:
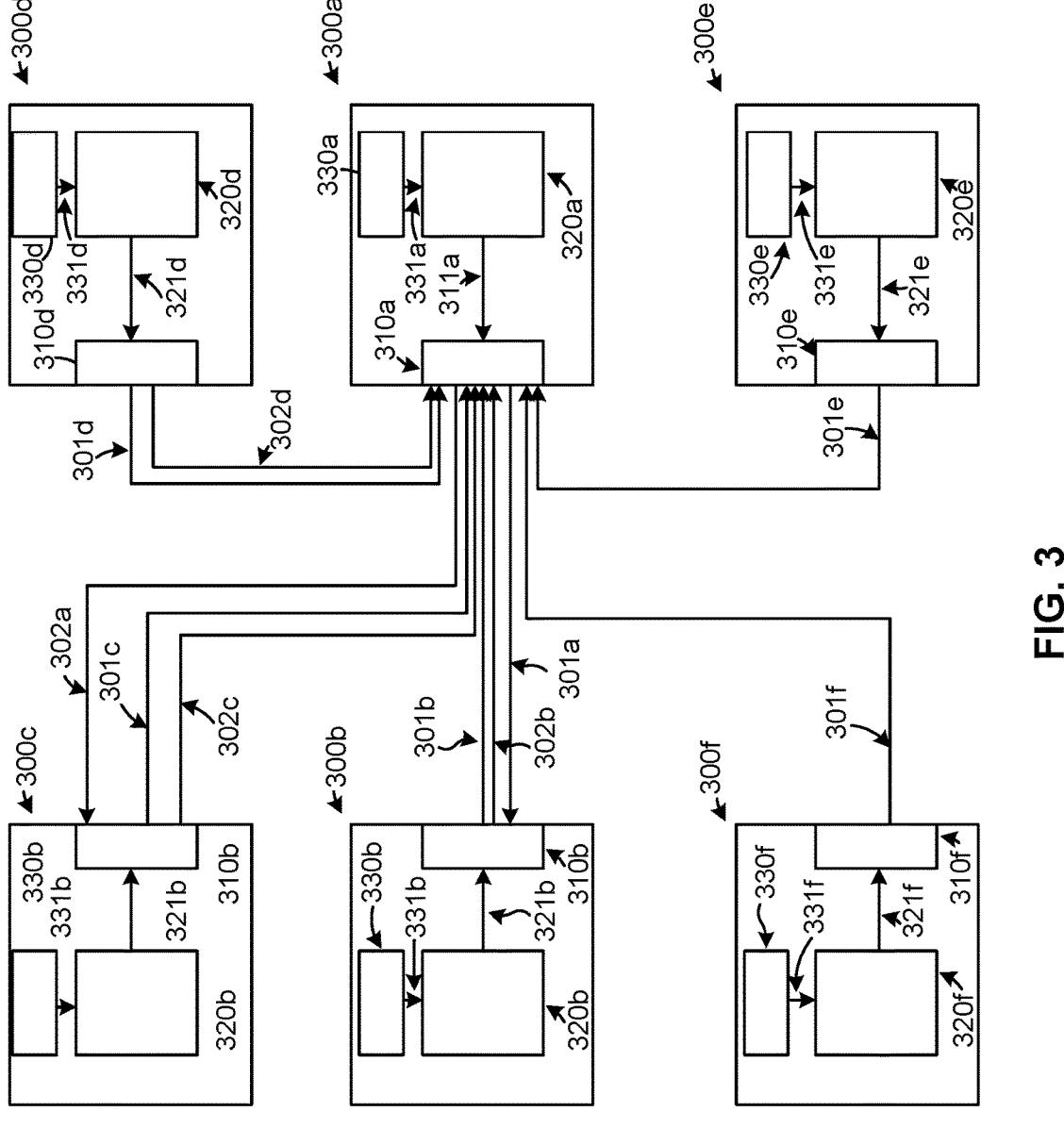
FIG. 3 shows a schematic view of a multiplicity of devices, according to some example implementations.

FIG. 3 shows a schematic view of a multiplicity of devices, according to some example implementations. As shown, in some implementations, the respective devices may be configured to be similar or even identical. The devices 300x (x=a-f) each comprise a communication apparatus 310*x*, a processing apparatus 320*x* and a sensor apparatus 330*x*. A respective sensor apparatus 330*x* is in each case configured to provide information 331*x* for a corresponding processing apparatus 320*x*. A more detailed explanation is given below of the device 300*a*, the communication apparatus 310*a* of which is configured to receive a multiplicity of signals 301*b-f* from further devices and, based thereon, to provide information 311*a* to the processing apparatus 320*a*. A respective signal 301*b-f* is provided in each case by a communication apparatus 310*b-f* based on information 321*b-f* from a respective processing apparatus 320*b-f*.

It should be noted here that the example implementation shown in FIG. 3 should be understood merely to be an example and communication, as shown and explained for example above in FIG. 2, may thus also take place bidirectionally and in particular in a different communication direction than that shown.

As explained below with reference to FIG. 3, some example implementations comprise applying an exclusion principle in order to identify devices that should form a common wireless network.

For this purpose, as shown in FIG. 3, the communication apparatus 310*a* is configured to receive the plurality of signals 301*b-f* from further devices 300*b-f*, wherein the received signals each contain comparison information, different from an ID, of a respective device. The processing apparatus 320*a* is configured to evaluate the plurality of received comparison information items of the further device 300*b-f*. The processing unit 320*a* is furthermore configured, based on the evaluation, to exclude devices of the plurality of further devices 300*b-f* from forming the at least part of the wireless network in order to produce a list of devices that have not been excluded. In this case, the device 300*a* is configured to form at least part of the wireless network together with at least one device in the list of devices.

Corresponding signals 301*b-f* may in this case comprise any combination of the comparison information explained above, that is to say for example in particular comparison information encoded into a corresponding signal, such as for example sensor measured values or else comparison information able to be extracted from physical properties of the respective signal, such as for example a signal strength based on which for example it is possible to infer a distance of a corresponding further device 300*b-f* from the device 300*a*.

Based on a corresponding evaluation in the processing apparatus 320*a*, the devices 300*c*, 300*f* may thus for example be excluded from forming a common wireless network, for example due to an excessively large deviation of the associated sensor measured values of the two devices from the sensor measured value of the device 300*a*, such that the list of devices comprises for example the devices 300*b*, 300*c* and 300*d*.

According to some example implementations, a corresponding list may be narrowed down further. For this purpose, in some implementations, the communication apparatus 310*a* is configured to receive a second signal (here signals 302*b-d*) from at least one device (here devices 300*b-d*) in the list of devices, wherein the second signal contains second comparison information different from an ID. In this case, the processing apparatus 320*a* is configured to evaluate the second received comparison information based on the criterion or based on a second criterion. The device 300*a* is furthermore configured, based on the evaluation, to form at least part of the wireless network together with the device, associated with the second comparison information, in the list of devices and, based on the evaluation, to exclude the at least one device, associated with the second comparison information, in the list of devices from forming the at least part of the wireless network and to reduce the list accordingly.

As shown in FIG. 3, the devices in the list of devices, that is to say the devices 300*b*, 300*c* and 300*d*, may each provide a second signal 302*y* (y=b,c,d) containing the second comparison information. The second comparison information may in turn comprise for example information about the type of sensor, for example "tire pressure sensor", a sensor measured value, for example "acceleration", "temperature", a signal strength, for example "RSSI", direction information and/or position information. It should be noted here that this second comparison information may contain the same type of information as the previously transmitted comparison information, that is to say for example both times an acceleration measured value, or else a fundamentally different type of information, for example when the first comparison information comprises an acceleration and the second information comprises distance information.

Corresponding second comparison information may thus for example be an update of the first comparison information, that is to say for example an updated sensor measured value or else additional information independent therefrom. In some implementations, the processing apparatus 220*a* is accordingly configured to evaluate corresponding comparison information based on the same criterion or based on a new criterion. In turn, corresponding criteria may be predetermined or else generated adaptively or dynamically.

By way of example, the signal 301*c* could comprise a first acceleration measured value of the device 300*c*, wherein the second signal 302*c* comprises an update of the measured value and the processing apparatus 320*a* for example concludes that both measured values have a sufficiently small deviation from a separate sensor measured value of the sensor apparatus 330*a*, and the device 300*c* is thus still considered to be a candidate for forming the network. A signal 301*d* could for example likewise comprise an acceleration measured value that is within a tolerance range for forming a wireless network, but wherein for example the next signal 302*d* in time, in addition thereto, for example contains information about a distance of the device 300*d* to the device 300*a*, based on which, despite a suitable acceleration, the device 300*d* may be excluded from forming the network.

The processing apparatus 320*a* may thus for example adapt the list in such a way that, for example, the devices 300*b* and 300*c* remain as candidates for forming the wireless network but the device 300*d* is excluded. With reference to this example, it should once again be noted that, for example, in order to evaluate the comparison information of the device 300*c*, an identical criterion may be used in the processing apparatus 320*a* to assess the acceleration values, whereas, with regard to the signals 301*d* and 302*d*, different criteria may be used, for example due to the different nature of the comparison information.

It should once again be noted here that the second signal may thus for example be a temporal update of the first signal, as explained above, for example an update of acceleration measured values. Accordingly, according to some example implementations, the second comparison information may contain an update of previously received comparison information of a device in the list of devices and the processing apparatus, that is to say for example processing apparatus 320*a*, may be configured to evaluate the second comparison information based on the same criterion as the previously received comparison information of the same device, that is to say for example device 300c.

Accordingly, it should one again be noted here that the second comparison information, belonging to a device in the list of devices, may contain information that differs with regard to the type of information from the previously received comparison information of the same device, that is to say for example device 300d. In this case, the processing apparatus, that is to say for example processing apparatus 320a, may be configured to evaluate the second comparison information based on the same criterion as the previously received comparison information of the same device (for example a percentage deviation, such as for example ±1%, which is equally applicable for example to temperature and acceleration measured values). As an alternative or in addition, a corresponding processing apparatus, that is to say for example processing apparatus 320a, may be configured to evaluate the second comparison information based on the second criterion. It should once again be noted here that relative, absolute and at the same time predetermined or adaptive criteria may be used, according to some example implementations.

In some implementations, the device 300a is furthermore configured to communicate with the further devices and to take into consideration feedback from the further devices as to whether a proposed device, that is to say for example a device in the list of devices, should or should not belong to the wireless network.

In some implementations, the communication apparatus 310a in FIG. 3 is therefore configured to provide at least one further device (that is to say here for example 300d, 300c) in the list of devices with information (for example IDs of the potential members of the network) about the list and to receive a response signal from the at least one further device, wherein the response signal contains a confirmation or a rejection with regard to the membership of at least one device in the list. As shown in FIG. 3, the communication apparatus 310 may for this purpose be configured to provide a signal 301a to the device 300b and to provide a signal 302a to the device 300c.

In some implementations, the device 300a is furthermore configured to form at least part of the wireless network with a device confirmed by way of the response signal and to exclude a device rejected by way of the received response signal from the at least part of the wireless network and to reduce the list accordingly.

For the sake of clarity, the additional response signals of the devices 300b and 300c are not shown in FIG. 3. Thus, for example, according to some example implementations, corresponding devices may for example use respective processing apparatuses 320x to analyze corresponding information about lists of potential network participants, or for example also compare same with self-generated lists. Thus, some example implementations in turn enable adaptive determination or development of criteria based on which it is possible to determine membership of a corresponding wireless network. However, a corresponding evaluation with regard to membership may also take place only based on a comparison of the lists.

Thus, for example, the device 300a may communicate to the device 300b that it assumes that the device 300a should form a network together with the devices 300b and 300c. By way of example, based on previous communication of the device 300d with the further devices, corresponding information may be compared for example with a list of potential network members generated by the device 300b itself, wherein for example confirmation of a list member or else for example the entire list of potential network participants may be reported back. Analogously, the device 300a may accordingly also communicate the list of potential members, comprising the devices 300a, 300b and 300c, to the device 300c.

Some example implementations are not limited here to a specific form of decision-making. By way of example, a list may thus be confirmed in order to form a network if all potential participants in the list match the list. However, for example, a "majority vote" of the potentially participating devices may also be used. By way of example, if a majority of the potential devices in the list matches the list, a corresponding network may be formed. It should also be noted again here that, based on the criteria, it is possible to define necessary criteria that may lead to an "exclusion of veto" of a device, for example. By way of example, adaptively defined criteria may in turn be taken into consideration for example with regard to a majority vote regarding the membership of a device in the wireless network.

According to the above explanations, according to some example implementations, a device may also give a further device feedback regarding such a list of potential devices for forming a wireless network. Generally speaking, a communication apparatus 310a may thus be configured to receive information about a list of devices from a further device, for example a device 300b. The processing apparatus 320a is then, in some implementations, configured to determine a response signal based on an evaluation of comparison information of a device in the list of devices, wherein the response signal contains a confirmation or a rejection with regard to the membership, of the device in the list, in the list with regard to forming a wireless network. In this case, the communication apparatus 310a is then, in some implementations, configured to provide the response signal to the further device. Furthermore, in some implementations, the device 300a is accordingly configured to form at least part of the wireless network with the device in the list if the response signal contains a confirmation and to exclude the device in the list from forming the at least part of the wireless network and to reduce the list accordingly if the response signal contains a rejection.

It is once again emphasized here that for example, based on a list transmission from the device 300b to the device 300a, the device 300a is able to evaluate comparison information that it received from another, further device if that same further device is part of the list. In other words, a confirmation or rejection is not limited to a device transmitting the list, but rather information about membership of any device in the list may be transmitted. This may in particular have advantages when potential lists are exchanged among devices according to some example implementations, such that devices that are for example not within transmission range for all devices are to be verified with regard to membership of the wireless network.

In some implementations, a device is furthermore configured, according to some example implementations, to adapt the list of devices iteratively, based on successive evaluations, and to form at least part of the wireless network with the devices in the adapted list. Criteria may thus be adapted gradually, for example, and different criteria of different devices may also be taken into consideration, in particular in the exchange with further devices. Some example implementations thus enable the development and consideration of complex combinations of criteria, meaning that non-trivially connected networks may also be formed.

With reference to FIGS. 2 and 3, it should also be noted that, in some implementations, a processing apparatus 220a or 320a may also be configured, based on the evaluation, to exclude the further device, for example 200b or 300b, or for example a further device (300c, 300d, 300c, 300f as well), from forming the at least part of the wireless network. A corresponding communication apparatus 210a or 310a may also be configured here to provide the one or more further devices with information about such an exclusion. As an alternative or in addition, a corresponding communication apparatus is configured to receive, from the one or more further devices, information about an exclusion of the device, that is to say for example 200a, 300a, with regard to forming at least part of the common wireless network with the one or more further devices.

Communicating an exclusion of a device thus makes it possible to ensure for example that the excluded device starts a new search for potential members of a wireless network associated therewith. This makes it possible to ensure for example that any device of a set of devices has a chance to identify participants of an associated network even without a complete set of sufficient criteria for forming a common network. It is thus possible for example, for a device, to use criteria present within the device to define confirmations or exclusions itself, but at the same time external information about already confirmed relationships between devices or already denied relationships between devices may be taken into consideration for forming networks.

It should be noted at this point that devices, according to some example implementations, are able to receive comparison information from further devices and evaluate it, even while these are already part of a wireless network. The functionalities described above are thus not just limited to forming a wireless network anew. In other words, a device, for example a device 200a or 300a, while it is part of the wireless network, may be configured to receive the comparison information from the further device, that is to say for example device 200b, 300b, and evaluate it. Furthermore, in this case, a corresponding device 200a, 300a may be configured, based on the evaluation, to leave the network and/or, based on the evaluation, to provide a signal to incorporate the further device into the network by way of the communication apparatus and/or, based on the evaluation, to provide a signal to exclude the further device from the network by way of the communication apparatus.

In other words, the functionalities described above with regard to evaluation of comparison information may be used for example to constantly verify membership of the device in question of the network and, if necessary, to leave the network if for example a membership, represented by any criteria, no longer exists. It is accordingly also possible to perform participant management for members of the wireless network, for example by providing signals to incorporate or to exclude further devices, as described above. In turn, such signals may also be provided to devices other than the device in question that is to be added or excluded, that is to say for example, with reference to FIG. 3, the devices 300c, 300d, 300c, 300f, for example if all of the devices 300a-f already belong to a network and the device 300b is to be added or excluded. Accordingly, the further devices may take note of a corresponding signal and decide themselves about exclusion or addition of the device 300b. Thus, in turn, addition or exclusion of the device 300b may be decided on for example unanimously or by a majority vote of the devices of the network. Furthermore, according to some example implementations, incorporation or exclusion of a corresponding device may also be decided on based on the decision of a single device.

It should once again be noted at this point that the comparison information of a device, according to some example implementations, and/or one or more further devices contains at least one of information about a type of the device, an acceleration, a temperature, a signal strength, such as for example RSSI (Received Signal Strength Indication), direction information and/or a position.

Further example implementations are disclosed below with reference to multiple steps. It should however be noted that a corresponding sequence of steps and in particular a basic classification into steps serves only to improve understanding of the example implementations, and should in no way be considered to be limiting.

Figure 4:
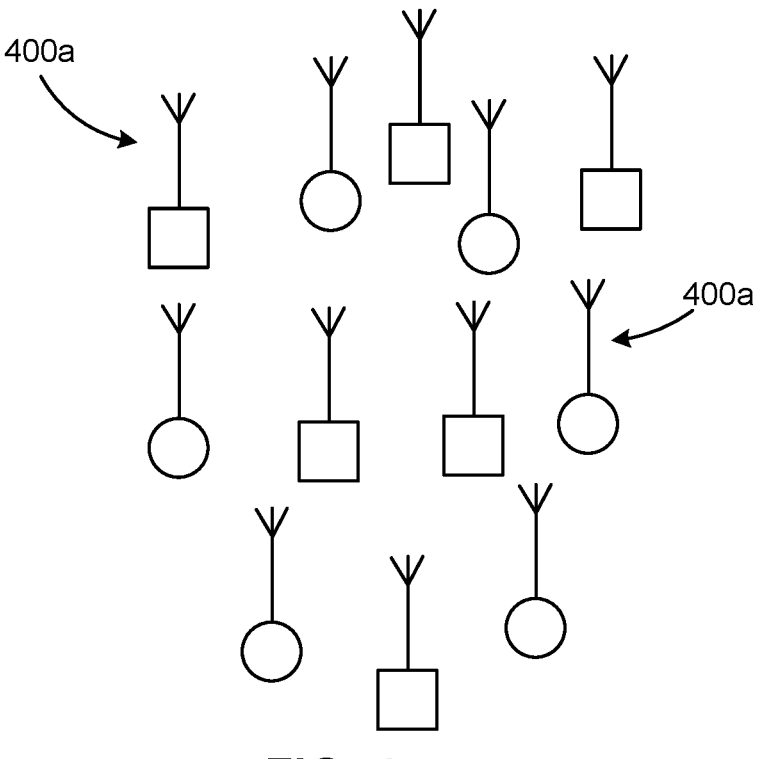
FIG. 4 shows a schematic illustration of a first initialization step, according to some example implementations.

FIG. 4 shows a schematic illustration of a first initialization step, according to some example implementations. FIG. 4 shows schematic views of a multiplicity of devices that are configured to form sensor nodes of a wireless network. FIG. 4 in this case illustrates two groups of devices: on the one hand, the devices 400a of the first group and the devices 400b of the second group. It should be noted at this point that each of the devices in FIG. 4 may have one or more or all of the features of the example implementations discussed in the context of FIGS. 1 to 3, that is to say for example in particular respective communication apparatuses, processing apparatuses and sensor apparatuses. Corresponding features may in this case be present individually or in any combination.

The devices illustrated in FIG. 4 are located here for example within a transmission range, but have not yet formed a network. A corresponding transmission range may refer here for example to a single device or else a transmission range of the device group, which may be achieved by forwarding information across multiple devices. In concrete terms, for example, the situation shown in FIG. 4 may refer to sensor nodes of two different vehicles, wherein the vehicles are for example located close to one another, that is to say for example in the immediate vicinity of one another, for example after both have left a production line.

The devices, that is to say for example the subsequent sensor nodes of a corresponding network, may accordingly have the knowledge that they are not alone in the world or, in other words, in their environment, and also for example that they should form a network, such as for example a mesh network with further sensor nodes that belong to the same system, that is to say for example to the same vehicle. Further examples of corresponding systems may for example be a common cargo, that is to say for example an item of cargo and devices or sensor nodes associated with the item of cargo, or else modular objects, such as for example a combination of a towing vehicle and a trailer having associated sensor nodes. In simple words, the situation in FIG. 4 may thus for example refer to a point in time at which the devices, which are also referred to below as sensor nodes or nodes for short, have just been switched on and know in principle that they should form a network with further sensor nodes, but do not yet know which sensor nodes within range belong or do not belong to their respective network.

Figure 5:
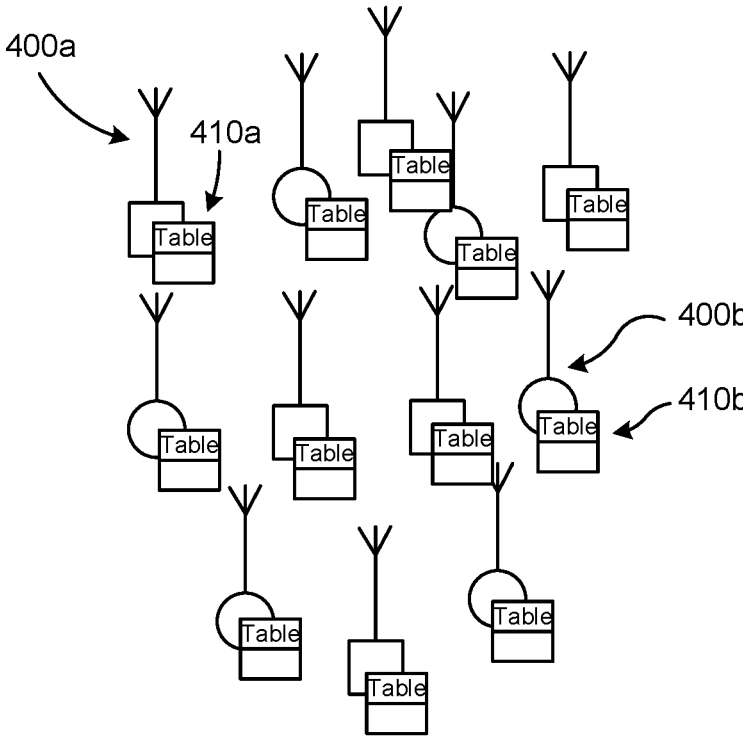
FIG. 5 shows a schematic illustration of a second step, according to some example implementations.

FIG. 5 shows a schematic illustration of a second step, according to some example implementations, which comprises for example scanning and/or sampling the environment. FIG. 5 shows the devices from FIG. 4, additionally with respectively associated tables 410a and 410b. The tables 410a and 410b in this case comprise comparison information, that is to say for example comparison information of other devices and, in some implementations, also "their own" comparison information, which may be used for a comparison with the received comparison information.

In other words, sensor nodes, for example each sensor node, as shown in FIG. 5, may thus, in such a second step according to some example implementations, collect "Advertisement Calls" (for example in the context of Bluetooth®) from other sensor nodes in the environment in order to put these, for example including comparison information present in such a transmission, in a table or list, for example if a network, for example a self-organizing mesh network, is able to be set up with that same node. In this case, it is possible in particular to take into consideration data, or it is possible to take into consideration or evaluate just nodes, which are able to be verified for their correctness with regard to membership of a corresponding network.

In addition, a corresponding sensor node may collect a multiplicity of possible data, that is to say for example in particular environment data. Such data may comprise for example information about an acceleration, a position, a temperature, a signal strength, for example an RSSI of another node and/or a direction of another node. It should be noted that for example some wireless standards support such direction information. Thus, for example, a corresponding table 410$a$, 410$b$ may comprise measured values, that is to say for example measured values of sensor apparatuses of the other nodes located in range or else information derived from corresponding transmission signals, for example in comparison to information encoded in a corresponding signal, such as a signal strength for example.

Figure 6:
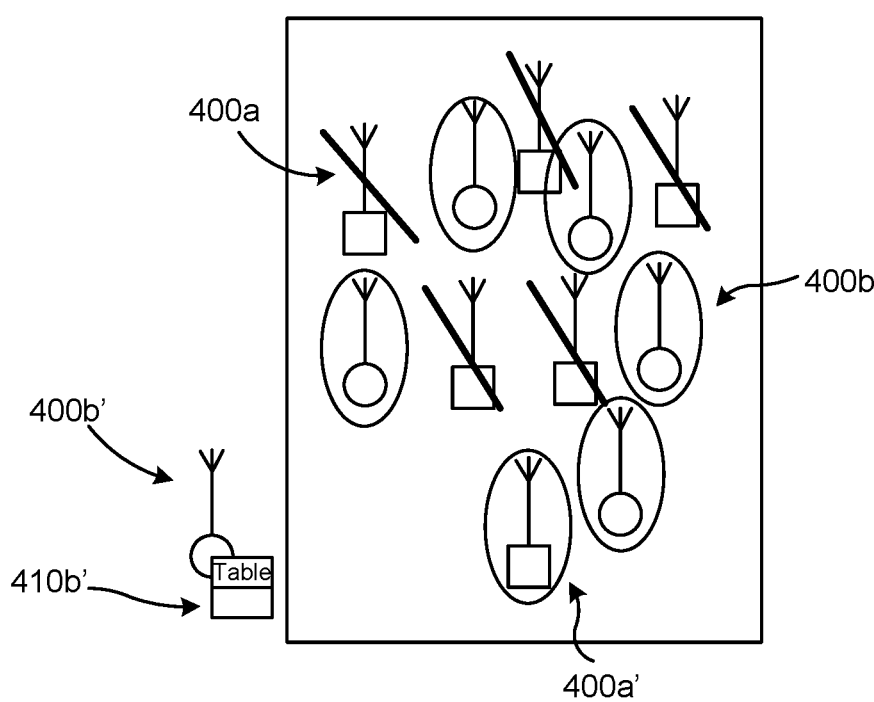
FIG. 6 shows a schematic illustration of a third step, according to some example implementations.

FIG. 6 shows a schematic illustration of a third step, according to some example implementations, comprising a first filter step. The further method is discussed here by way of example with reference to the device 400$b'$. Based on the associated table 410$b'$ comprising comparison information, in some implementations, the device 400$b'$ may for example already exclude a multiplicity of devices 400$a$ based on such a first filter step, in order to generate a list of possible devices with which the wireless network to which the device 400$b'$ should belong. As shown in FIG. 6, based on such a filter step, it may however be the case that not only devices 400$b$ are part of the list, but also for example a device 400$a'$ that belongs to the group of already excluded devices 400$a$ and should not become part of the network.

A corresponding filter step shall be discussed again here in other words with reference to a specific example.

In concrete terms, a first filter step according to FIG. 6 may be performed for example based on a temporal availability of further sensor nodes or their comparison information, for example in the form of measured values. In other words, for example, after a certain period of time, the comparison information, for example within a table 410$b'$ of the device 400$b'$, for example in the form of a set of data in a list, may make it possible to separate or to distinguish between separate nodes or for example node entries in the list of the same system, that is to say for example of the wireless network (comprising devices 400$b$), to which the device 400$b'$ should belong, from other sensor nodes, that is to say for example from other sensor node entries (of the devices 400$a$) in the table 410$b'$, specifically in that the sensor nodes not belonging to the common wireless network (that is to say for example invalid sensor nodes) were only available for a short period of time.

One example of this may be a vehicle that is parked in the same parking space or in the same parking lot. See also FIG. 6 in this regard, wherein the nodes in the group 400$a$ may for example belong to the vehicle located nearby and accordingly a sensor node 400$b'$ belonging to the group of sensor nodes 400$b$ of the other vehicle should not incorporate any of the nodes 400$a$ into a common wireless network of the sensor nodes 400$b$.

Sensor nodes may thus be excluded based on such a criterion. By way of example, a sensor node with poor availability, which is thus for example barely available or is only available for a short period of time, thus cannot be a valid member of the wireless network.

Figure 7:
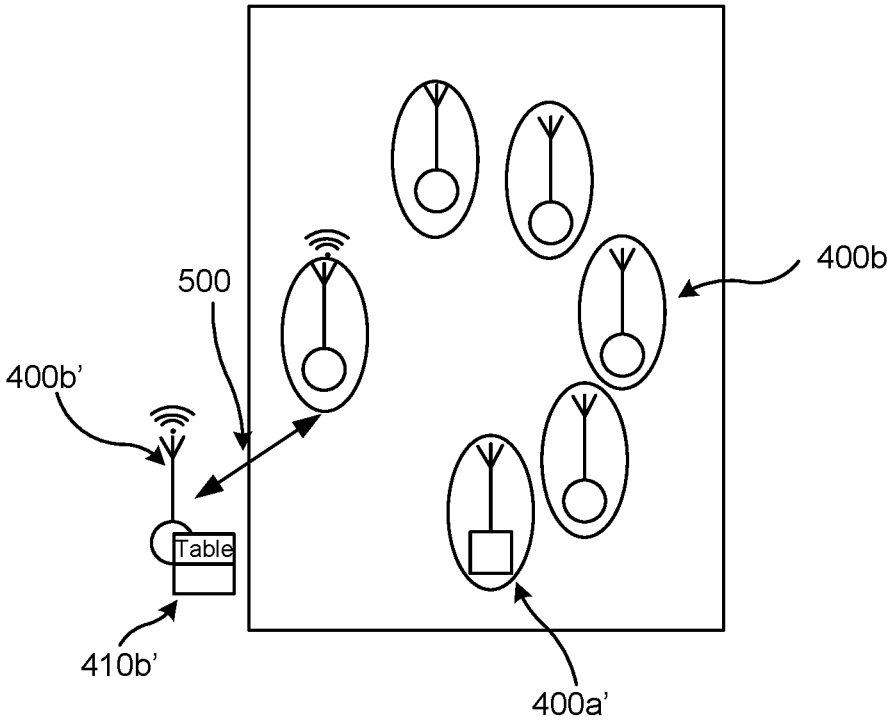
FIG. 7 shows a schematic illustration of a fourth step, according to some example implementations.

FIG. 7 shows a schematic illustration of a fourth step, according to some example implementations, comprising removal of gaps. By way of example, after a first filter step (for example according to FIG. 6), nodes or even each node may comprise a separate list of potential partners for forming a wireless network, for example a mesh network. However, such a list may for example still comprise nodes that should not be part of the network. Therefore, those same nodes may or must be removed from such a list. In this regard, FIG. 7 shows the situation from FIG. 6, wherein the devices that have already been excluded in the first filter step are no longer illustrated. The table 410$b'$ comprising comparison information may in this case for example comprise the list of potential sensor nodes for forming the wireless network, wherein the list may for example in each case comprise information about the device 400$b$ actually belonging to the common network and also the device 400$a'$ that is still erroneously present.

In such a fourth step, sensor nodes, that is to say for example sensor node 400$b'$, may then communicate with other sensor nodes (500) in order to find similarities, such as for example an identical speed with respect to the environment (=same vehicle or trailer) or for example a common knowledge level or a common position.

In other words, in such a step, it is possible to apply for example predetermined criteria or else adaptive criteria that are self-generated in such a step and to analyze comparison information of the device in the list of devices that are considered to form the wireless network.

Figure 8:
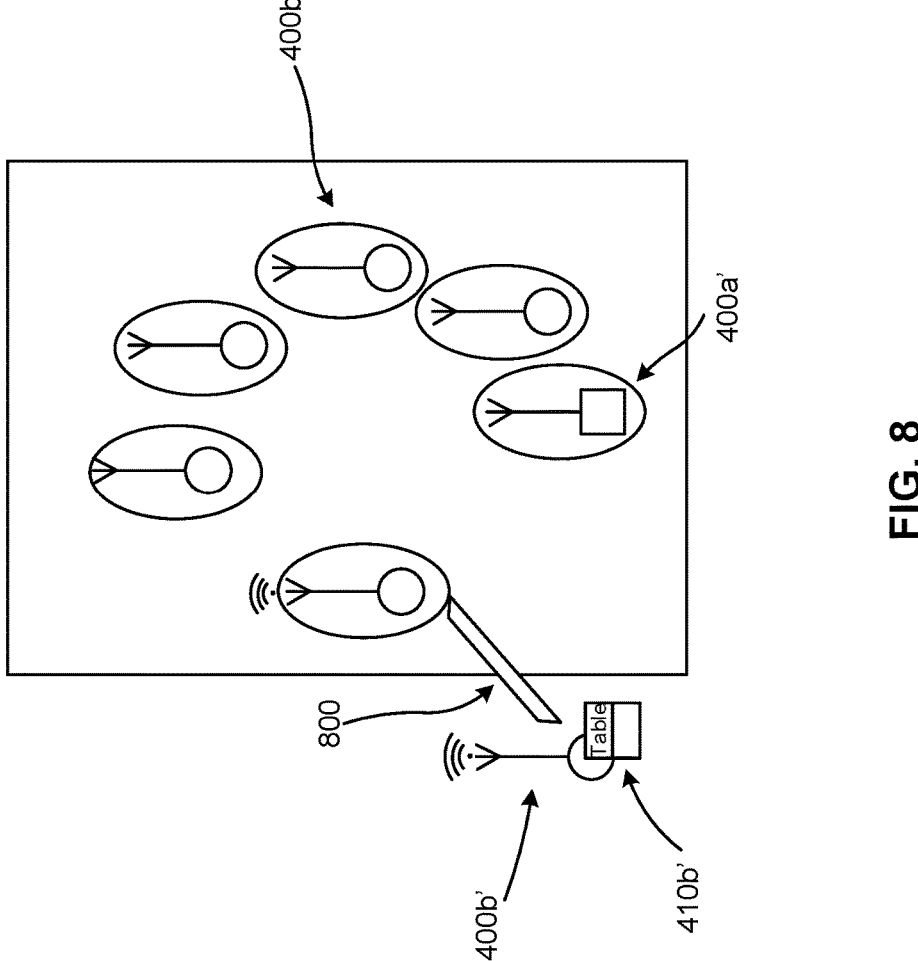
FIG. 8 shows a schematic illustration of a fifth step, according to some example implementations.

FIG. 8 shows a schematic illustration of a fifth step, according to some example implementations, comprising a well-founded assumption. In such a fifth step, a first node, that is to say for example device 400$b'$, may communicate an assumption with regard to associated network participants based on the filtered list (for example step 3) and based on the experience of the device 400$b'$ with regard to the communication with surrounding possible sensor nodes (for example step 4). Nodes in this list may provide feedback regarding the assumed network participants, for example in a manner known from the game "Cluedo"®. By way of example, if all sensor nodes, that is to say for example all sensor nodes in question, agree on one or more specific participants, a routing table may be created or set up.

Thus, for example, starting from the device 410$b'$, a first network connection 800 to a first of the devices 400$b$ may be defined.

Figures 9A, 9B, 9C:
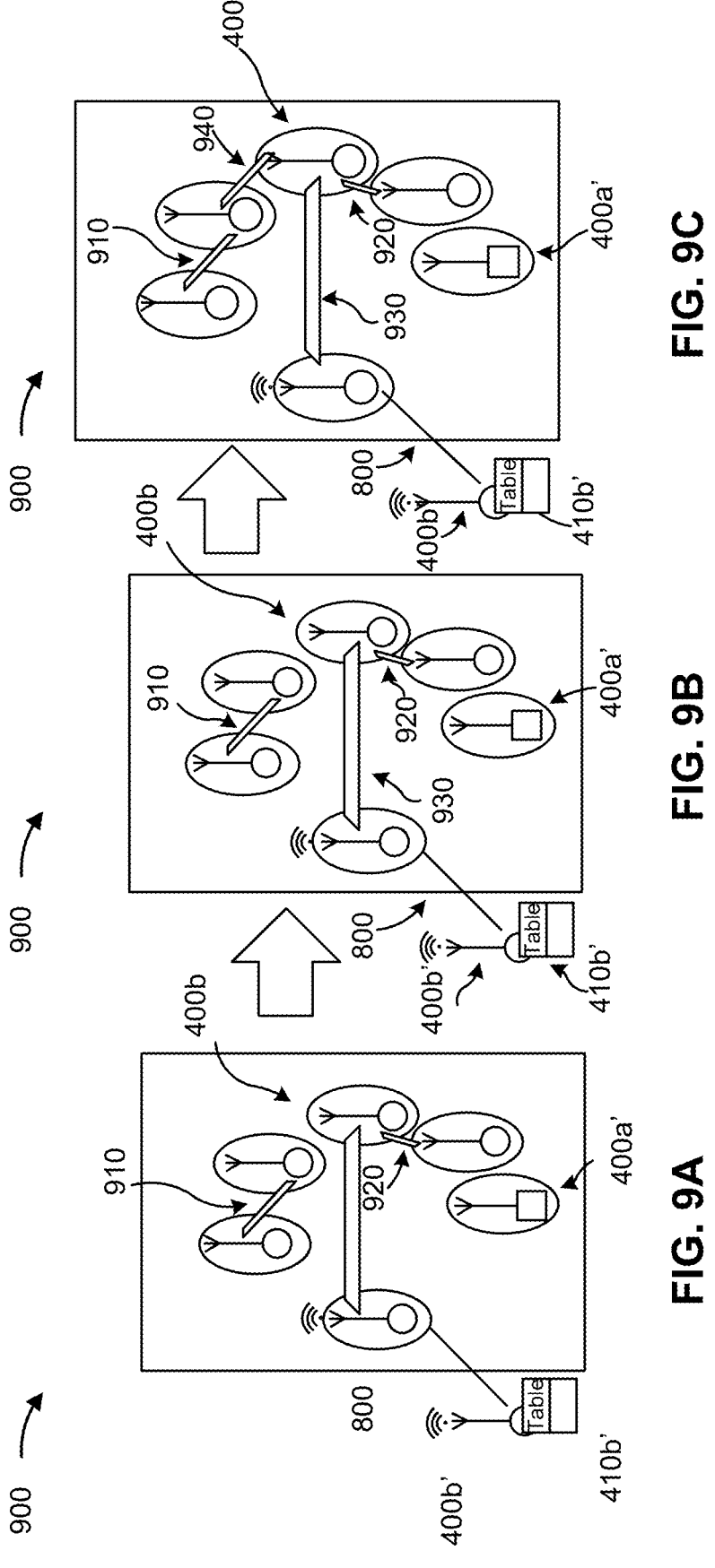
FIGS. 9A-9C show a schematic illustration of a sixth step, according to some example implementations.

FIG. 9 shows a schematic illustration of a sixth step, according to some example implementations, comprising forming the wireless network. The sensor nodes may repeat the method, as described in step 5 for example, until the wireless network, that is to say for example a mesh network, has been set up in multiple steps. By way of example, as shown in FIG. 9$a$), further devices of the group of the device 400$b$ may form first network connections 910, 920 based on the previously explained evaluation of comparison information based on a criterion. Shown in FIGS. 9$b$) and 9$c$), further connections 930, 940 may be created starting from the already formed subnetworks, as a result of which the wireless network is formed iteratively. However, the procedure shown in FIG. 9 and the formation of smaller sub-groups and subsequent connection thereof should be understood to be just an example. Thus, according to some example implementations, starting from a group of two, a third device could thus also be added directly to the existing network to form the common wireless network.

Figures 10, 11:
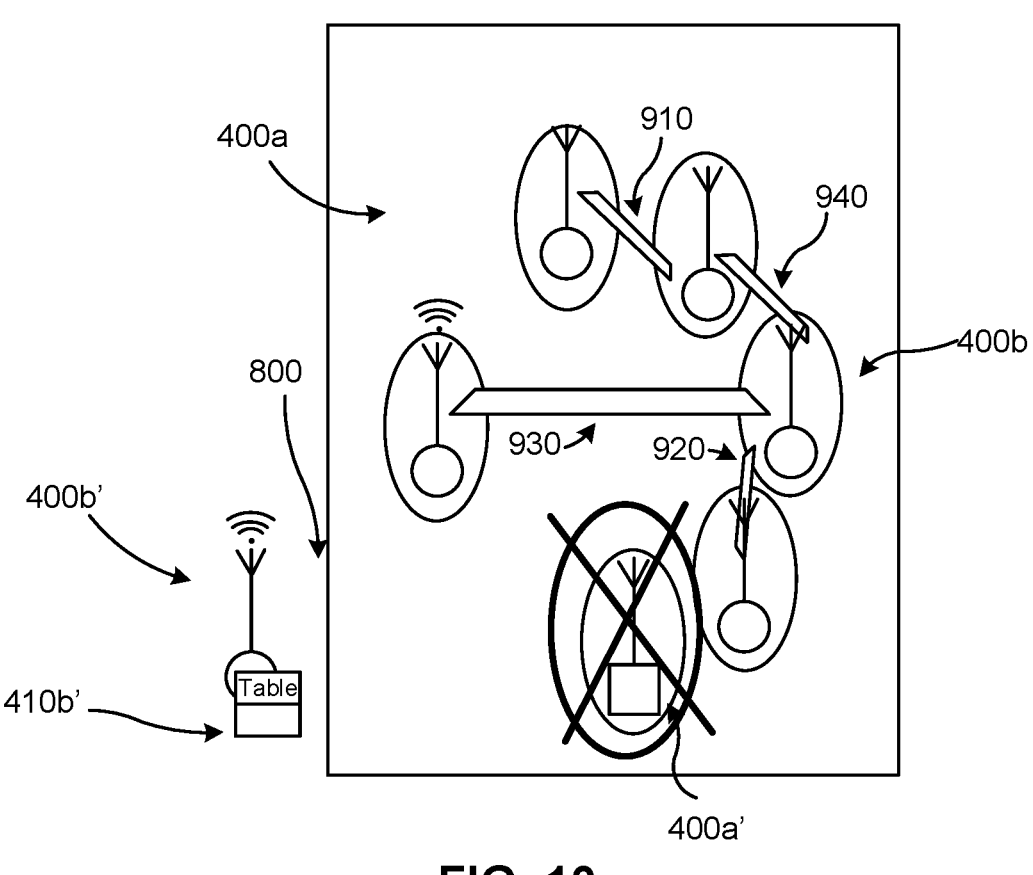
FIG. 10 shows a schematic illustration of a seventh step, according to some example implementations.
FIG. 11 shows a schematic illustration of an eighth step, according to some example implementations.

FIG. 10 shows a schematic illustration of a seventh step, according to some example implementations, comprising informing further devices or sensor nodes. Sensor nodes that have been excluded from forming the wireless network may be informed about the exclusion in order to enable them to reattempt to form their own network with other remaining sensor nodes. One of the nodes of the group 400*b* could thus for example give the sensor node 400*a*' a corresponding notification in order to prompt the node 400*a*' to form a network with the previously excluded nodes 400*a* (see FIG. 6*a*).

FIG. 11 shows a schematic illustration of an eighth step, according to some example implementations, comprising sampling with regard to changes. In some implementations, the nodes of a formed wireless network, that is to say for example of an already formed mesh network, may periodically repeat or periodically carry out the steps of identifying a new sensor node, that is to say for example steps 2 to 7. This may be advantageous or necessary for example when a trailer is attached to a vehicle, new cargo is added, or a system is modified or improved. In other words, the sensor nodes of the group of sensor nodes 400*b* may scan their environment constantly in order to recognize further sensor nodes, such as for example the sensor node 400*b*", and to compare respective comparison information in order to incorporate a corresponding node into the network or to exclude it from corresponding incorporation into the network. In this case, the node 400*b*" may in turn be informed about a corresponding evaluation result or inform the further devices itself.

Figure 12:
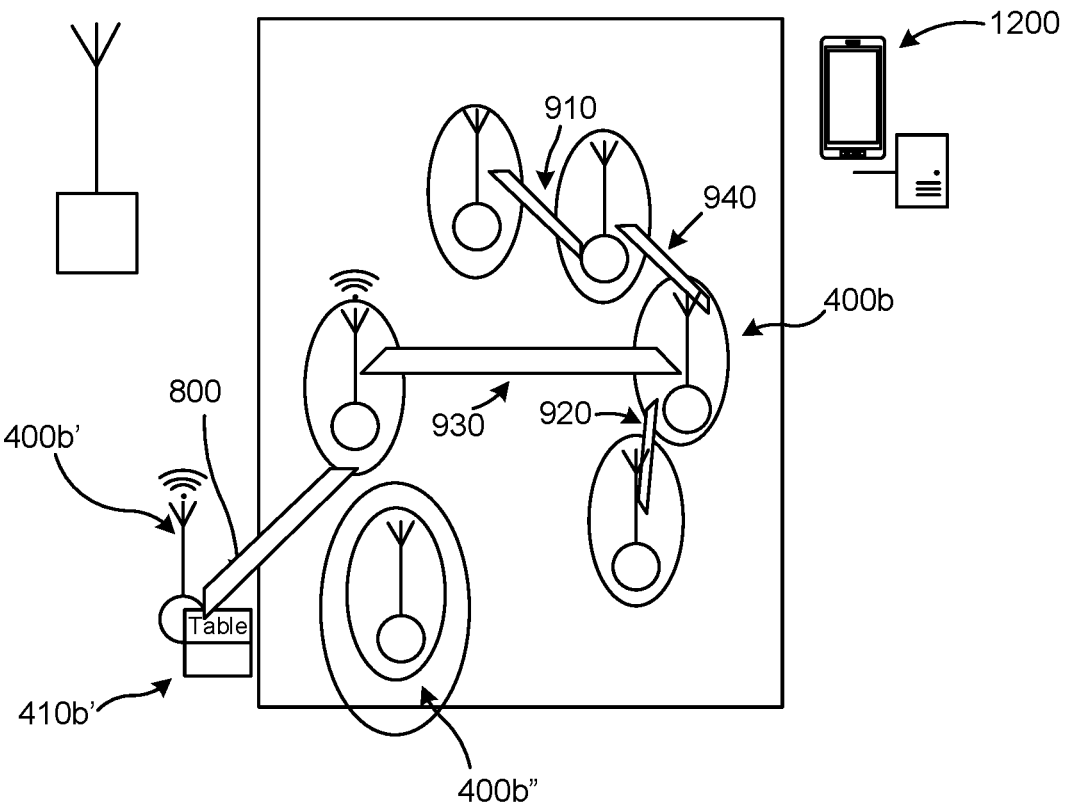
FIG. 12 shows a schematic view of a system, according to some example implementations.

FIG. 12 shows a schematic view of a system, according to some example implementations. A corresponding system in this case comprises at least one device (for example a device of the devices 400*b*, for example device 400*b*' and/or 400*b*") and a control apparatus 1200. The control apparatus 1200 is configured in this case to provide the device with information (for example the position of further sensor nodes) with regard to further devices with which the wireless network should be formed. As an alternative or in addition, the control apparatus 1200 is configured to provide the device with information regarding readout properties that are to be set (for example temporally in the role of a data readout) of a sensor apparatus of the device. As an alternative or in addition, the control apparatus 1200 is configured to provide the device with characteristic information (for example a number of sensor nodes) with regard to the wireless network.

However, it should be noted that systems, according to some example implementations, do not necessarily have to comprise a control apparatus. A system, according to some example implementations, may thus for example comprise a plurality of devices 400*b* (comprising device 400*b*'), see FIGS. 4-11. In some implementations, the devices 400*b* in this case each have a sensor apparatus for determining a sensor measured value, wherein a respective sensor measured value contains information about a physically measurable property of the respective device and/or information about a physically measurable state of a respective device.

As discussed above, corresponding devices are, in some implementations, configured to communicate the sensor measured values among one another and evaluate them, to communicate the evaluation results among one other, and to form the wireless network based on the evaluation results.

In concrete terms, the control unit 1200 may be housed for example in a vehicle or in a hand-held device and communicate with the network (for example or preferably in encrypted form) in order to provide the network with useful information. Examples of such information may comprise: a number of tires of a vehicle, which may also be used for example to determine the number of network participants in a TPMS (Tire Pressure Monitoring System). Furthermore, such a control unit 1200 may be used to communicate to sensor nodes what is required or expected of them, for example with regard to a time interval to read out data, for example sensor data (smart meter). Furthermore, a corresponding control unit 1200 may provide information about positions and/or possible new network members (for example after the addition of a trailer).

It should once again be noted here that a device, according to some example implementations, may be a sensor node of a wireless network of an object. As suggested in the previous example implementation, the object may be for example a vehicle, a vehicle with a trailer or else a container. Accordingly, the device, in some implementations, has a sensor apparatus that is configured to record at least one sensor measured value, that is to say for example an acceleration of the vehicle or a temperature, for example of a container. Further devices with which the wireless network should be formed are then accordingly likewise sensor nodes of the object. The comparison information, different from an ID and provided to the device, of the one or more further devices in this case for example then comprises a sensor measured value of a sensor apparatus of a corresponding further device. For the evaluation with regard to membership of the wireless network, respective sensor measured values comprise information about a physically measurable property of the respective object and/or information about a physically measurable state of the respective object. When evaluating the comparison information, the sensor nodes may then conclude whether they each belong to the same object or to different objects in order thus to conclude whether or not they should form a common network.

In particular, as explained above, the vehicle may be an object, wherein the device, according to some example implementations, is a sensor node of the vehicle at a difficult-to-access location of the vehicle or on a movable part of the vehicle. The respective sensor measured value may in this case contain in particular at least one of information regarding a rate of rotation, an acceleration and/or a speed of the vehicle or of the part of the vehicle. As explained above, the device, that is to say for example a processing apparatus of the device, may decide, based on an evaluation of a criterion, whether or not a further device is a sensor node of the same vehicle and, based thereon, accordingly enter or not enter into a network connection with a further device.

Some example implementations in this case address in particular exposed sensors or sensors that cannot be wired, for example in the case of TPMS (Tire Pressure Monitoring System), sensors on rotor blades, for example of wind turbines, construction machines that are intended to carry out synchronized tasks, storage systems (for example containers at the same height or in the same rows). Furthermore, some example implementations address wireless communication on the consumer market, for example for tokens, in order to mark objects and find them again later, for example for theft prevention. Some example implementations also address application cases in building automation (for example home automation).

In addition, some example implementations may be used for applications in the technical field of networks or network technology, Bluetooth®, mesh, that is to say for example mesh networks, the automotive industry, automotive engineering, sensors, in particular for or as sensors, IoT (Internet of Things), self-organization, for example self-organizing networks and, more generally, network organization.

Fields of application for some example implementations in this case comprise in particular networks, Bluetooth®, Wi-Fi, wireless applications, sensors, and/or merging sensor data.

One principle or basic principle of some example implementations shall be described again below in other words:

After initial commissioning (for example initial start-up), a group of devices, according to some example implementations, that is to say for example wireless communication devices, may form a network in order to bridge distances that a far-away sensor node, that is to say for example a corresponding wireless communication device, could not bridge alone. Each sensor node may in this case have available information (for example in the form of a list or table) that describes which other nodes are part of the network. Corresponding information may be determined using for example all available data (for example signal strength, for example RSSI (Received Signal Strength Indicator), directed RSSI (for example information about relative position of devices), other sensor data, such as for example ACC (for example acceleration data, acceleration measured values), gyro (for example yaw rate data, yaw rate measured values), SSIDs (Service Set Identifier), and further information for or with regard to a location (for example site), orientation and/or position).

Nodes that are for example within range but are not part of the network/system/vehicle should or must be identified so that those same nodes are not connected to the network to be set up.

Very generally speaking, it should once again be noted at this point that one advantage, or even the main advantage, of some example implementations may be the fact that devices, systems and networks may be self-organizing according to some example implementations. Thus, according to some example implementations (specifically with the aid of a device according to some example implementations), it is possible to recognize whether or not a communication device is part of the network to be set up. This makes it possible to bypass manual and expensive configuration and at the same time to ensure and/or provide a high degree of flexibility with regard to changes. By way of example, some example implementations may thus address defects and/or reconfigurations by a user (for example attaching a trailer to a vehicle), that is to say for example also enable robust and for example automatic formation or updating of a network in such cases.

Thus, as explained above, some example implementations may have great business potential (in particular for example significant improvements with regard to network flexibility and robustness) in IoT applications and/or in or for networks in the automotive industry. Some example implementations may in this case enable in particular organization of such networks, wherein such network organization, according to some example implementations, may play a key role for the creation of related standards.

Furthermore, it should be noted that some example implementations, for example the use of networks according to some example implementations, make it possible to save costs, for example with regard to maintenance and/or wiring (wiring operations may for example be expensive and difficult, which means for example that some example implementations make it possible to save on corresponding wiring operations, thereby making it possible for example in particular to save $CO_2$).

Some example implementations in this case in particular encompass devices that are configured to communicate wirelessly with other participants (and for example potential participants) of a network, and are furthermore configured to distinguish between devices within a communication range with regard to membership of the network and the suitability or unsuitability of the devices for joining the network. By way of example, an algorithm or a manual interaction may be used for this purpose.

Some example implementations may in particular have advantages here for companies, or be used for corresponding application cases that deal with networks or communication in hardware and/or software.

FIG. 13 shows a schematic block diagram of a method for providing a sensor node of a wireless network by way of a device, according to some example implementations. The method 1300 in this case comprises receiving, 1310, a signal from a further device that is configured to form a sensor node of a wireless network, wherein the signal contains comparison information different from an ID (for example information about type of sensor (for example tire pressure sensor), sensor measured value (for example acceleration, temperature), RSSI, direction information, position).

The method 1300 furthermore comprises evaluating, 1320, the received comparison information of the further device based on a criterion and setting up, 1330, a wireless network connection between the device and the further device if the criterion is met.

Some example implementations are summarized below:

Some example implementations encompass a device for providing a sensor node of a wireless network, wherein the device has the following features: a communication apparatus that is configured to receive a signal from a further device that is configured to form a sensor node of a wireless network, wherein the signal contains comparison information different from an ID, and a processing apparatus that is configured to evaluate the received comparison information of the further device based on a criterion. In this case, the device is configured to form at least part of the wireless network together with the further device if the criterion is met.

According to some example implementations, the comparison information contains at least one of information about a physically measurable property of the further device, information about a physically measurable state of the further device and/or information about a spatial relationship between the device and the further device.

According to some example implementations, the processing apparatus is configured to decode the comparison information of the further device based on the received signal. As an alternative or in addition, the comparison information of the further device contains information about a physical property of the signal received from the further device, and the processing apparatus is configured to derive the information about the physical property from the received signal.

According to some example implementations, the device furthermore has a sensor apparatus that is configured to record at least one sensor measured value; wherein the comparison information of the further device contains at least one sensor measured value of a sensor apparatus of the further device. In this case, the processing apparatus is configured to compare the at least one received sensor measured value of the further device with the at least one sensor measured value of the device and to evaluate the comparison result based on the criterion. As an alternative or in addition, the processing apparatus is configured to evaluate both the at least one received sensor measured value of the further device and the at least one sensor measured value of the device based on the criterion.

According to some example implementations, the processing apparatus is configured to carry out an evaluation based on the criterion in order to evaluate whether the comparison result and/or a respective sensor measured value is within an absolute or relative value range.

According to some example implementations, the processing unit is configured to determine and/or adapt the criterion based on an additional reception signal; and the communication apparatus is configured to receive the additional reception signal.

According to some example implementations, the received signal of the further device contains a plurality of comparison information items different from an ID. In this case, the processing apparatus is configured to evaluate the plurality of comparison information items based on a plurality of criteria and to compare different comparison information items with different criteria. As an alternative or in addition, the processing apparatus is configured to evaluate the plurality of comparison information items based on the criterion. Furthermore, the device is configured in this case to form at least part of the wireless network together with the further device if a predetermined number of comparison information items meet the respective associated criterion and/or if at least a predetermined number of comparison information items meet the criterion.

According to some example implementations, the communication apparatus is configured to provide the at least one further device with comparison information, different from an ID, of the device and to receive information about an evaluation of the provided comparison information of the device from the further device. In this case, the device is configured to form at least part of the wireless network together with the further device based on the received information about the evaluation.

According to some example implementations, the communication apparatus is configured to receive a plurality of signals from a plurality of further devices, wherein the received signals each contain comparison information, different from an ID, of a respective further device. In this case, the processing apparatus is configured to evaluate the plurality of received comparison information items of the further devices. The processing apparatus is in this case furthermore configured, based on the evaluation, to exclude devices of the plurality of further devices from forming the at least part of the wireless network in order to produce a list of devices that have not been excluded. In this case, the device is configured to form at least part of the wireless network together with at least one device in the list of devices.

According to some example implementations, the communication apparatus is configured to receive a second signal from at least one device in the list of devices, wherein the second signal contains second comparison information different from an ID. In this case, the processing apparatus is configured to evaluate the second received comparison information based on the criterion or based on a second criterion. The device is in this case furthermore configured, based on the evaluation, to form at least part of the wireless network together with the device, associated with the second comparison information, in the list of devices and, based on the evaluation, to exclude the at least one device, associated with the second comparison information, in the list of devices from forming the at least part of the wireless network and to reduce the list accordingly.

According to some example implementations, the second comparison information contains an update of previously received comparison information of a device in the list of devices and the processing apparatus is configured to evaluate the second comparison information based on the same criterion as the previously received comparison information of the same device.

According to some example implementations, the second comparison information, belonging to a device in the list of devices, contains information different from the previously received comparison information of the same device with regard to the type of information and the processing apparatus is configured to evaluate the second comparison information based on the same criterion as the previously received comparison information of the same device.

According to some example implementations, the communication apparatus is configured to provide at least one further device in the list of devices with information about the list, and to receive a response signal from the at least one further device, wherein the response signal contains a confirmation or a rejection with regard to the membership of at least one device in the list. In this case, the device is configured to form at least part of the wireless network with a device confirmed by way of the response signal and to exclude a device rejected by way of the received response signal from forming the at least part of the wireless network and to reduce the list accordingly.

According to some example implementations, the communication apparatus is configured to receive information about a list of devices from the further device and the processing apparatus is configured to determine a response signal based on an evaluation of comparison information of a device in the list of devices, wherein the response signal contains a confirmation or a rejection with regard to the membership, of the device in the list, in the list with regard to forming a wireless network. Furthermore, the communication apparatus is in this case configured to provide the response signal to the further device and the device is configured to form at least part of the wireless network with the device in the list if the response signal contains a confirmation and to exclude the device in the list from forming the at least part of the wireless network and to reduce the list accordingly if the response signal contains a rejection.

According to some example implementations, the device is configured to adapt the list of devices iteratively, based on successive evaluations, and to form at least part of the wireless network with the devices in the adapted list.

According to some example implementations, the processing apparatus is configured to exclude the further device from forming the at least part of the wireless network based on the evaluation, and the communication apparatus is configured to provide the further device with information about such an exclusion. As an alternative or in addition, the communication apparatus is configured to receive, from the further device, information about an exclusion of the device with regard to forming at least part of a common wireless network with the further device.

According to some example implementations, the device, while it is part of the wireless network, is configured to receive the comparison information from the further device and evaluate it, and the device is configured, based on the evaluation, to leave the network, and/or, based on the evaluation, to provide a signal to incorporate the further device into the network by way of the communication apparatus and/or, based on the evaluation, to provide a signal to exclude the further device from the network by way of the communication apparatus.

According to some example implementations, the comparison information of the device and/or of the further device contains at least one of information about a type of the device, an acceleration, a temperature, a signal strength, such as for example RSSI, direction information and/or a position.

According to some example implementations, the device is a sensor node of a wireless sensor network of an object and the device has a sensor apparatus that is configured to record at least one sensor measured value. In this case, the further device is a sensor node of an object and the comparison information, different from an ID, of the further device contains at least one sensor measured value of a sensor apparatus of the further device. Furthermore, the respective sensor measured value in this case contains information about a physically measurable property of the respective object and/or information about a physically measurable state of the respective object and the processing apparatus is configured to evaluate the at least one received sensor measured value of the further device and the at least one sensor measured value of the device. Furthermore, the processing apparatus is in this case configured to decide, based on the evaluation, whether the object of the device is the same object as the object of the further device, and the device is configured to form a network connection with the further device if the object of the device is the same object as the object of the further device.

According to some example implementations, the object is a vehicle; and the device is a sensor node of the vehicle at a difficult-to-access location of the vehicle or on a movable part of the vehicle. In this case, the respective sensor measured value contains at least one of information regarding a rate of rotation, an acceleration and/or a speed of the vehicle and/or of the part of the vehicle and the processing apparatus is configured to decide, based on the evaluation, whether the further device is a sensor node of the same vehicle. Furthermore, the sensor node is in this case configured to form a network connection with the further sensor node if the further device is a sensor node of the same vehicle.

Some example implementations furthermore encompass a system comprising a device according to one of the example implementations described herein and a control apparatus, wherein the control apparatus is configured to provide the device with information regarding further devices with which the wireless network should be formed, and/or to provide the device with information regarding readout properties that are to be set of a sensor apparatus of the device, and/or to provide the device with characteristic information regarding the wireless network.

Furthermore, some example implementations encompass a system for a wireless network having a plurality of devices according to one of the example implementations described herein, wherein the devices each have a sensor apparatus for determining a sensor measured value, wherein a respective sensor measured value contains information about a physically measurable property of the respective device and/or information about a physically measurable state of a respective device and wherein the devices are configured to communicate the sensor measured values among one another and evaluate them, and to communicate the evaluation results among one another. The devices are in this case configured to form the wireless network based on the evaluation results.

Furthermore, some example implementations encompass a method for providing a sensor node of a wireless network by way of a device, comprising receiving a signal from a further device that is configured to form a sensor node of a wireless network, wherein the signal contains comparison information different from an ID, evaluating the received comparison information of the further device based on a criterion and setting up a wireless network connection between the device and the further device if the criterion is met.

Furthermore, some example implementations encompass a computer program containing a program code for performing a method according to one of the example implementations described herein when the program runs on a computer.

In some example implementations, the processing apparatus may be implemented by any suitable circuit structures, for example microprocessor circuits, ASIC circuits, CMOS circuits and the like. In some example implementations, the processing circuit may be implemented as a combination of hardware structures and machine-readable commands. By way of example, the processing apparatus may have a processor and a storage apparatus that store machine-readable commands that provide the described functionalities and result in the methods described herein being performed when they are executed by the processor. Furthermore, some example implementations may include a storage apparatus that may be implemented by any suitable storage devices, for example ROM, PROM, EPROM, EEPROM, Flash memory, FRAM (ferroelectric RAM), MRAM (magnetoresistive RAM), or phase change RAM.

All lists of materials, environmental influences, electrical properties and optical properties listed herein should be considered to be examples and not to be conclusive.

Although some aspects have been described in connection with a device, it goes without saying that these aspects also constitute a description of the corresponding method, such that a block or a component of a device should also be understood as a corresponding method step or as a feature of a method step. Similarly, aspects that have been described in connection with or as a method step also constitute a description of a corresponding block or detail or feature of a corresponding device. Some or all of the method steps may be carried out by a hardware apparatus (or using a hardware apparatus), such as for example a microprocessor, a programmable computer, or an electronic circuit. In some example implementations, some or several of the most important method steps may be carried out by such an apparatus.

Depending on specific implementation requirements, some example implementations may be implemented in hardware or in software. The implementation may be performed using a digital storage medium, for example a floppy disk, a DVD, a Blu-Ray disk, a CD, a ROM, a PROM, an EPROM, an EEPROM or a Flash memory, a hard disk or another magnetic or optical memory containing electronically readable control signals that interact or are able to interact with a programmable computer system such that the respective method is performed. The digital storage medium may therefore be computer-readable.

Some example implementations thus encompass a data carrier containing electronically readable control signals that are able to interact with a programmable computer system such that one of the methods described herein is performed.

Generally speaking, some example implementations may be implemented as a computer program product containing a program code, wherein the program code is effective in performing one of the methods when the computer program product runs on a computer.

By way of example, the program code may also be stored on a machine-readable carrier.

Other example implementations encompass the computer program for performing one of the methods described herein, wherein the computer program is stored on a machine-readable carrier.

In other words, one example implementation of the method is thus a computer program that contains a program code for performing one of the methods described herein when the computer program runs on a computer.

A further example implementation of the method is thus a data carrier (or a digital storage medium or a computer-readable medium) on which the computer program for performing one of the methods described herein is recorded. The data carrier, the digital storage medium or the computer-readable medium are typically objective and/or non-transient.

A further example implementation of the method is thus a data stream or a sequence of signals that constitutes the computer program for performing one of the methods described herein. The data stream or the sequence of signals may be configured for example to be transferred via a data communication connection, for example over the Internet.

A further example implementation encompasses a processing apparatus, for example a computer or a programmable logic component, that is configured or adapted to perform one of the methods described herein.

A further example implementation encompasses a computer on which the computer program for performing one of the methods described herein is installed.

A further example implementation encompasses a device or a system that is configured to transmit a computer program for performing at least one of the methods described herein to a receiver. The transmission may for example take place electronically or optically. By way of example, the receiver may be a computer, a mobile device, a storage device or a similar device. The device or the system may comprise for example a file server for transmitting the computer program to the receiver.

In some example implementations, a programmable logic component (for example a field-programmable gate array, FPGA) may be used to perform some or all of the functionalities of the methods described herein. In some example implementations, a field-programmable gate array may interact with a microprocessor to perform one of the methods described herein. Generally speaking, the methods, in some example implementations, are carried out by any hardware device. This may be universally applicable hardware such as a computer processor (CPU) or hardware specific to the method, such as for example an ASIC.

The devices described herein may be implemented for example using a hardware apparatus, or using a computer, or using a combination of a hardware apparatus and a computer.

The devices described herein, or any components of the devices described herein, may be implemented at least partially in hardware and/or in software (computer program).

The methods described herein may be implemented for example using a hardware apparatus, or using a computer, or using a combination of a hardware apparatus and a computer.

The methods described herein, or any components of the methods described herein, may be implemented at least partially by hardware and/or by software.

The example implementations described above merely illustrate the principles of the present disclosure. It goes without saying that modifications and variations of the arrangements and details described herein will be obvious to others skilled in the art. It is therefore intended for the disclosure to be limited only by the scope of protection of the claims below, and not by the specific details that have been presented herein with reference to the description and the explanation of the example implementations.

The invention claimed is:

1. A first device for providing a first sensor node of a wireless network, wherein the first device comprises:
 a communication apparatus configured to receive a signal from a second device that is configured to form a second sensor node of the wireless network,
  wherein the signal contains comparison information, and
  wherein the comparison information is different from an ID of the second device; and
 a processing apparatus that is configured to evaluate the comparison information based on a criterion,
  wherein the first device is configured to form at least part of the wireless network together with the second device if the criterion is met.

2. The first device as claimed in claim 1,
 wherein the comparison information contains at least one of:
  information about a physically measurable property of the second device,
  information about a physically measurable state of the second device, or
  information about a spatial relationship between the first device and the second device.

3. The first device as claimed in claim 1, wherein the processing apparatus is configured to:
 decode the comparison information based on the signal received from the second device, and/or
 wherein the comparison information contains information about a physical property of the signal received from the second device, and the processing apparatus is configured to derive the information about the physical property from the signal received from the second device.

4. The first device as claimed in claim 1, further comprising:
 a sensor apparatus that is configured to record at least one first sensor measured value,
 wherein the comparison information contains at least one second sensor measured value of a sensor apparatus of the second device,
 wherein the processing apparatus is configured to compare the at least one second sensor measured value with the at least one first sensor measured value and to evaluate a result of comparing the at least one second sensor measured value with the at least one first sensor measured value based on the criterion, and/or
 wherein the processing apparatus is configured to evaluate both the at least one second received sensor measured value and the at least one first sensor measured value based on the criterion.

5. The first device as claimed in claim 4, wherein the processing apparatus is configured to carry out an evaluation based on the criterion to evaluate whether one or more of:

the result of comparing the at least one second sensor measured value with the at least one first sensor measured value is within an absolute value range or a relative value range, the at least one first sensor measured value is within the absolute value range or the relative value range, or the at least one second sensor measured value is within the absolute value range or the relative value range.

6. The first device as claimed claim 4, wherein the processing unit is configured to determine and/or adapt the criterion based on an additional signal, and wherein the communication apparatus is configured to receive the additional signal.

7. The first device as claimed in claim 1, wherein the signal received from the second device contains a plurality of comparison information items that are different from the ID of the second device, wherein the processing apparatus is configured to:

evaluate the plurality of comparison information items based on a plurality of criteria, compare different comparison information items of the plurality of comparison information items with different criteria of the plurality of criteria, and/or evaluate the plurality of comparison information items based on the criterion; and wherein the first device is configured to form the at least part of the wireless network together with the second device:

if a predetermined number of the different comparison information items meet the different criteria, and/or if at least a predetermined number of the plurality of comparison information items meet the criterion.

8. The first device as claimed in claim 1, wherein the communication apparatus is configured to:

provide the second device with second comparison information that is different from an ID of the first device, and receive information about an evaluation of the second comparison information from the second device; and wherein the first device is configured to form the at least part of the wireless network together with the second device based on the received information about the evaluation.

9. The first device as claimed in claim 1, wherein the communication apparatus is configured to:

receive a plurality of signals of a plurality of third devices, wherein the received plurality of signals each contain comparison information that is different from an ID of a respective third device of the plurality of third devices, wherein the processing apparatus is configured to:

perform an evaluation of the comparison information contained in the plurality of signals, based on the evaluation, exclude third devices of the plurality of third devices from forming the at least part of the wireless network, and produce a list of third devices that have not been excluded from forming the at least part of the wireless network, and wherein the first device is configured to form the at least part of the wireless network together with at least one third device included in the list of third devices that have not been excluded from forming the at least part of the wireless network.

10. The first device as claimed in claim 9, wherein the communication apparatus is configured to receive a second signal from at least one third device included in the list of third devices that have not been excluded from forming the at least part of the wireless network, wherein the second signal contains second comparison information that different from an ID of the at least one third device;

wherein the processing apparatus is configured to perform an evaluation of the second comparison information based on the criterion or based on a second criterion;

wherein the first device is configured to:

form the at least part of the wireless network together with the at least one third device included in the list of third devices that have not been excluded from forming the at least part of the wireless network based on the evaluation indicating that the second comparison information meets the criterion or meets the second criterion, and based on the evaluation indicating that the second comparison information does not meet the criterion or the second criterion, exclude the at least one third device from forming the at least part of the wireless network and reduce the list of third devices that have not been excluded from forming the at least part of the wireless network accordingly.

11. The first device as claimed in claim 10, wherein the second comparison information contains an update of previously received comparison information of a third device included in the list of third devices that have not been excluded from forming the at least part of the wireless network, and wherein the processing apparatus is configured to evaluate the second comparison information and the previously received comparison information of the third device based on a same criterion.

12. The first device as claimed in claim 10, wherein the second comparison information contains an update of previously received comparison information of a third device included in the list of third devices that have not been excluded from forming the at least part of the wireless network, wherein the update of the previously received comparison information contains information different from the previously received comparison information of the third device with regard to a type of information, and wherein the processing apparatus is configured to evaluate the update of the previously received comparison information based on a same criterion as the previously received comparison information of the third device and/or to evaluate the update of the previously received comparison information based on the second criterion.

13. The first device as claimed in claim 9, wherein the communication apparatus is configured to:

provide at least one third device included in the list of third devices that have not been excluded from forming the at least part of the wireless network with information about the list of third devices that have not been excluded from forming the at least part of the wireless network, and receive a response signal from the at least one third device included in the list of third devices that have not been excluded from forming the at least part of the wireless network, wherein the response signal contains a confirmation or a rejection with regard to a membership of the at least one third device included in the list of third devices that have not been excluded from forming the at least part of the wireless network; and wherein the first device is configured to form the at least part of the wireless network with the at least one third device included in the list of third devices that have not been excluded from forming at least part of the wireless network when the response signal contains the confirmation, and to exclude the at least one third device included in the list of third devices that have not been excluded from forming the at least part of the wireless network from forming the at least part of the wireless network when the response signal includes the rejection and to reduce the list of third devices that have not been excluded from forming the at least part of the wireless network accordingly.

14. The first device as claimed in claim 1, wherein the communication apparatus is configured to receive information about a list of devices from the second device;

wherein the processing apparatus is configured to determine a response signal based on an evaluation of comparison information of a third device included in the list of devices, wherein the response signal contains a confirmation or a rejection with regard to a membership, of the third device, in the list of devices with regard to forming a wireless network;

wherein the communication apparatus is configured to provide the response signal to the second device; and wherein the first device is configured to:

form the at least part of the wireless network with the third device if the response signal contains the confirmation, and exclude the third device from forming the at least part of the wireless network and reduce the list accordingly if the response signal contains the rejection.

15. The first device as claimed in claim 14, wherein the first device is configured to adapt the list of devices iteratively, based on successive evaluations, and to form the at least part of the wireless network with devices included in the adapted list of devices.

16. The first device as claimed in claim 1, wherein the processing apparatus is configured to exclude the second device from forming the at least part of the wireless network based on evaluating the comparison information based on the criterion, and wherein the communication apparatus is configured to provide the second device with information about such an exclusion; and/or wherein the communication apparatus is configured to receive, from the second device, information about an exclusion of the second device with regard to forming at least part of a common wireless network with the second device.

17. The first device as claimed in claim 1, wherein the first device, while the first device is part of the wireless network, is configured to:

receive additional comparison information from the second device, perform an evaluation of the additional comparison information, based on the evaluation, leave the network, based on the evaluation, provide a signal to incorporate the second device into the network by way of the communication apparatus, and/or based on the evaluation, provide a signal to exclude the second device from the network by way of the communication apparatus.

18. The first device as claimed in claim 1, wherein the comparison information includes at least one of:

information about a type of the second device, an acceleration of the second device, a temperature of the second device, a signal strength associated with the second device, direction information, or a position of the second device.

19. The first device as claimed in claim 1, wherein the first device is included in a first object, wherein the first device has a first sensor apparatus that is configured to record at least one first sensor measured value, wherein the second device is included in a second object, wherein the comparison information contains at least one second sensor measured value of a second sensor apparatus of the second device, wherein the at least one second sensor measured value contains information about a physically measurable property of the second object and/or information about a physically measurable state of the second object, wherein the processing apparatus is configured to perform an evaluation of the at least one second sensor measured value of the second device and the at least one first sensor measured value of the first device, wherein the processing apparatus is configured to determine, based on the evaluation, whether the first object is a same object as the second object, and wherein the first device is configured to form a network connection with the second device if the first object is the same object as the second object.

20. The first device as claimed in claim 19, wherein the first object is a vehicle, wherein the first device is at a difficult-to-access location of the vehicle or on a movable part of the vehicle, wherein the at least one first sensor measured value contains at least one of information regarding a rate of rotation, an acceleration, and/or a speed of the vehicle and/or of the part of the vehicle, wherein the processing apparatus is configured to determine, based on the evaluation, whether the second device is the second sensor node of the vehicle, and wherein the first sensor node is configured to form a network connection with the second sensor node if the second device is the second sensor node of the vehicle.

* * * * *